United States Patent
Kittur et al.

(10) Patent No.: US 11,294,984 B2
(45) Date of Patent: Apr. 5, 2022

(54) METHODS OF PROVIDING A SEARCH-ECOSYSTEM USER INTERFACE FOR SEARCHING INFORMATION USING A SOFTWARE-BASED SEARCH TOOL AND SOFTWARE FOR SAME

(71) Applicant: Carnegie Mellon University, Pittsburgh, PA (US)

(72) Inventors: Aniket Kittur, Pittsburgh, PA (US); Nathan Patrick Hahn, Pittsburgh, PA (US); Joseph Chee Chang, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 147 days.

(21) Appl. No.: 16/463,068

(22) PCT Filed: Nov. 22, 2017

(86) PCT No.: PCT/US2017/062990
§ 371 (c)(1),
(2) Date: May 22, 2019

(87) PCT Pub. No.: WO2018/098259
PCT Pub. Date: May 31, 2018

(65) Prior Publication Data
US 2019/0286683 A1 Sep. 19, 2019

Related U.S. Application Data

(60) Provisional application No. 62/497,604, filed on Nov. 22, 2016.

(51) Int. Cl.
*G06F 16/00* (2019.01)
*G06F 16/957* (2019.01)
(Continued)

(52) U.S. Cl.
CPC ............ *G06F 16/9577* (2019.01); *G06F 7/00* (2013.01); *G06F 16/951* (2019.01);
(Continued)

(58) Field of Classification Search
CPC ............. G06F 16/9577; G06F 16/9535; G06F 16/9537; G06F 16/951; G06F 16/9538; G06F 7/00; H04L 67/22
See application file for complete search history.

(56) References Cited

U.S. PATENT DOCUMENTS 7,797,635 B1 * 9/2010 Denise ................ G06F 16/9038
715/738
10,007,729 B1 * 6/2018 Reed ...................... G06F 16/951
(Continued)

OTHER PUBLICATIONS

International Search Report and Written Opinion dated Apr. 5, 2018, in connection with PCT/US17/62990, filed Nov. 22, 2017.

*Primary Examiner* — Hung Q Pham
(74) *Attorney, Agent, or Firm* — Downs Rachlin Martin PLLC

(57) ABSTRACT

Methods of providing a search-ecosystem user interface that assist a user with searching information stored within a computer system and with managing results of the searching. In some embodiments, the methods include providing search-results items in an interactive workspace in which a user can manipulate the search-result items to make review more efficient. In some embodiments, the interactive workspace tracks user interactions with search-result items and visualizes such interaction to the user. In some embodiments, the methods include organizing search results using one or more task cards. In some embodiments, a user can add one or more additional sets of search results to a task card. In some embodiments, a user can share one or more task cards, interactive workspaces, and/or search-results items with one or more other users and allow such other
(Continued)

user(s) to interact therewith. Other methods are disclosed, as is software for implementing the methods.

22 Claims, 21 Drawing Sheets

(51) Int. Cl.
    *G06F 16/9535*     (2019.01)
    *G06F 16/9537*     (2019.01)
    *G06F 16/9538*     (2019.01)
    *H04L 67/50*     (2022.01)
    *G06F 7/00*     (2006.01)
    *G06F 16/951*     (2019.01)

(52) U.S. Cl.
    CPC ...... *G06F 16/9535* (2019.01); *G06F 16/9537* (2019.01); *G06F 16/9538* (2019.01); *H04L 67/22* (2013.01)

(56) References Cited

U.S. PATENT DOCUMENTS

| | | |
|---|---|---|
| 2002/0013834 A1 | 1/2002 | Esakov et al. |
| 2004/0139107 A1 | 7/2004 | Bachman et al. |
| 2006/0031196 A1 | 2/2006 | Oral et al. |
| 2006/0059440 A1 | 3/2006 | Pry |
| 2007/0038608 A1 | 2/2007 | Chen |
| 2008/0046218 A1* | 2/2008 | Dontcheva .............. G06F 11/32 702/186 |
| 2009/0248666 A1 | 10/2009 | Ahluwalia |
| 2010/0169792 A1* | 7/2010 | Ascar .................. G06F 11/3414 715/744 |
| 2011/0161419 A1 | 6/2011 | Chunilal |
| 2012/0240019 A1 | 9/2012 | Nuzzi |
| 2015/0100688 A1 | 4/2015 | Richardson et al. |

* cited by examiner

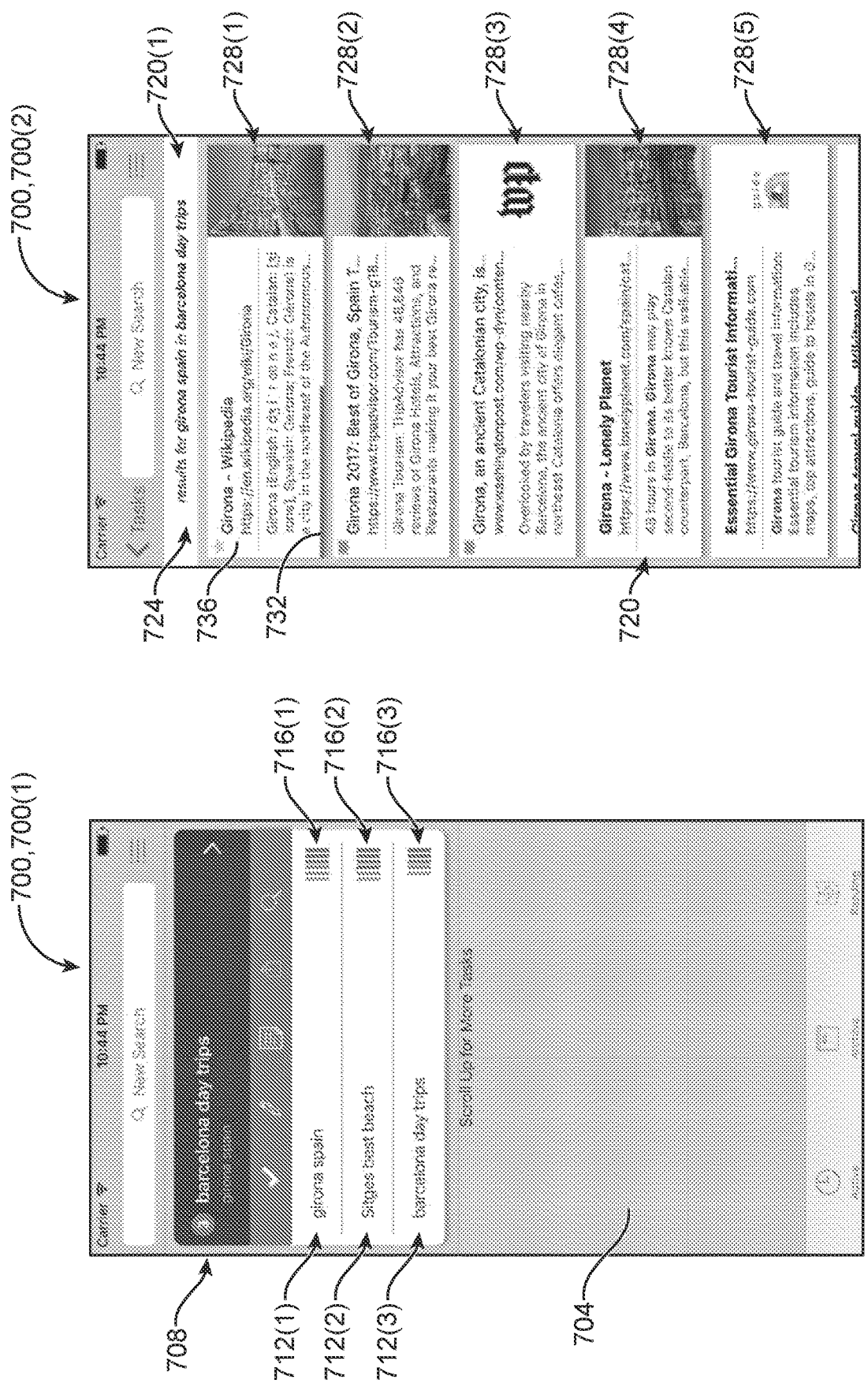

METHODS OF PROVIDING A SEARCH-ECOSYSTEM USER INTERFACE FOR SEARCHING INFORMATION USING A SOFTWARE-BASED SEARCH TOOL AND SOFTWARE FOR SAME

RELATED APPLICATION DATA

This application claims the benefit of priority of U.S. Provisional Patent Application Ser. No. 62/497,604, filed Nov. 22, 2016, and titled "Task management browser", which is incorporated by reference herein in its entirety.

GOVERNMENT RIGHTS

This invention was made with United States government support under IIS-1149797 awarded by the National Science Foundation. The U.S. government has certain rights in the invention.

FIELD OF THE INVENTION

The present invention generally relates to the field of software-based information-search tools. In particular, the present invention is directed to methods of providing a search-ecosystem user interface for searching information using a software-based search tool and software for same.

BACKGROUND

Over the years, a number of techniques have been developed to assist users when performing exploratory searches on the Internet. These techniques include manipulating search results through faceted browsing, assisting users with organizing sources, and providing an interface for synthesizing and comparing results. While there have been many attempts to improve exploratory search interfaces, few improvements have been adopted by industry and consumers. Some techniques, such as faceted browsing have become commonplace in specific exploratory interfaces. Online shopping interfaces regularly use this approach.

However, even with the implementation of some improvements, exploratory searching still remains a very demanding and cognitively difficult task for users. In the context of web browsers, this is evidenced by users' appropriation of browser tabs and notetaking tools to augment their sensemaking. Currently, a typical approach to managing complex searches is to open tabs from a search-results page, with more tabs being added as an initial page points to further pages of interest and new subtask queries get branched off. Managing these tabs can quickly get overwhelming as more subtasks are branched off, more pages are investigated, and other tasks are interleaved. These challenges are further exacerbated as searching increasingly moves to smartphones, where screen space is limited, annotation is difficult, and usage may be in short bursts and interrupted at any time.

Previous approaches to supporting this problem have explored ways to reduce the number of open tabs by saving or suspending them or providing a more organized overview of opened tabs. However, divorcing the management of tabs from the natural operations of exploratory searching can be problematic: it adds a layer of complexity; creates two separate places for the user's attention to be divided; it can be lost and forgotten once out of focus; and it can require additional effort to understand and manage which is only loosely coupled and thus may get out of sync with the main task. Furthermore, just keeping track of visited tabs is not enough to support the development of a user's complex mental model. Doing so requires keeping track of a user's evolving mental state by encoding how much progress they have made on each page or query, which items they might want to visit again later, what they plan to work on next, and managing branching tasks and subtasks.

SUMMARY OF THE DISCLOSURE

In one implementation, the present disclosure is directed to a method of providing a search-ecosystem user interface to assist a user with searching information stored within a computer system and with managing results of the searching. The method being performed by software providing the search-ecosystem user interface and includes displaying a first search-query configured to receive one or more search queries from the user; receiving a first search query input by the user into the first search-query field; sending the first search query to at least one search tool on the computer system; receiving a first set of search results from the at least one search tool in response to the first search query; storing the first set of search results in a workspace datastore as a first workspace list of first items; and displaying to the user the first workspace list in an interactive workspace that works in conjunction with the workspace datastore to 1) allow the user to manipulate and interact with the first items in the interactive workspace, 2) track user interactions with the first items within the interactive workspace; and 3) visualize the interactions with the first items within the interactive workspace.

In another implementation, the present disclosure is directed to a method of providing a search-ecosystem user interface to assist a user in searching information stored within a computer system and in managing results of the searching. The method being performed by software providing the search-ecosystem user interface and includes displaying a task-card-identification control; receiving a first task-card identifier from the user via the task-card-identification control; creating a first task card and associating the first task-card identifier with the first task card; displaying a task-card search-query field associated with the first task card; receiving a first search query input by the user into the task-card search-query field; sending, via the computer system, the first search query to at least one search tool on the computer system; displaying a first visual representation of the first task card to the user; and displaying on the first visual representation a first search link to the first list of items containing the first set of search results.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIG. 7A is a screenshot of an example task-card GUI of a search-ecosystem UI of the present disclosure, showing a single task-card visual representation;

FIG. 7B is a screenshot of an example interactive-workspace GUI of the search-ecosystem UI of FIG. 7A, illustrating various interactive-workspace functionalities;

Figure 1:
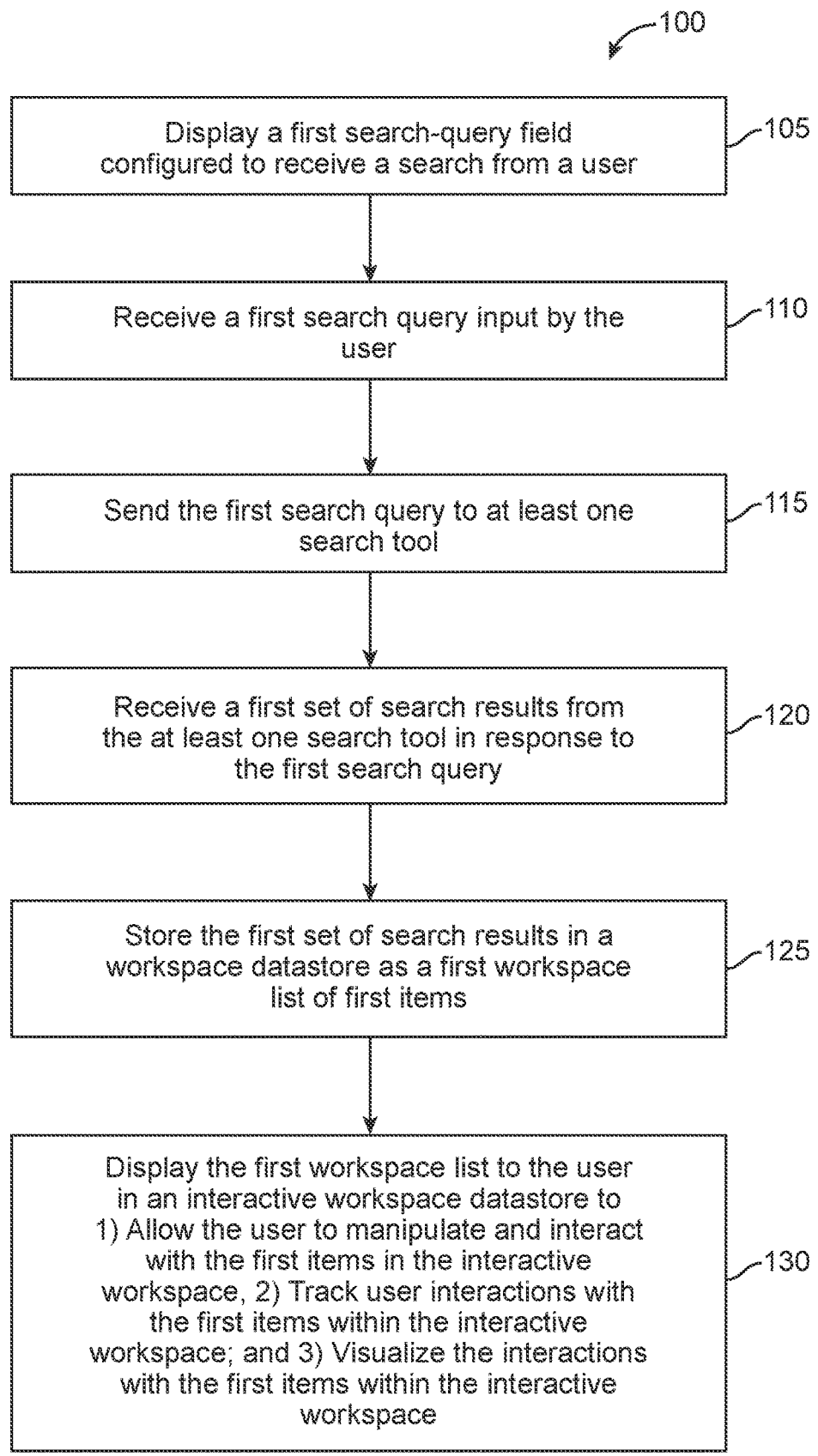
FIG. 1 is a flow diagram of an example method of providing a search-ecosystem user interface (UI) that provides an interactive workspace for assisting a user with searching.

It is noted that any trademarks and copyrighted material appearing in the accompanying drawings are used solely for the sakes of illustration and convenience and not any commercial purpose. Nor should their appearance be considered any sort of endorsement of the trademarks, copyrighted material, underlying products and/or services, or the respective owners. Any trademarks and copyrighted material appearing in the drawings are intellectual property of their respective owners.

DETAILED DESCRIPTION

In some aspects, the present disclosure is directed to methods of providing a search-ecosystem user interface (UI) for searching information available on a computer system. In some embodiments, a search-ecosystem UI of the present disclosure is deployed in a browser format that shifts away from the traditional tab design utilized by conventional browsers, and instead relies on a combination of high level "tasks" and trackable queries within those tasks. Rather than presenting a user with the last tab they had opened, some embodiments of a search-ecosystem UI of the present disclosure instead show users a set of tasks they are working on. From this list of tasks, users can quickly glance and see the progress they have made on an existing task or quickly make a new task by creating a new search. These high-level tasks are represented in embodiments of a search-ecosystem UI of the present disclosure as "task cards," which as described below provide a convenient analogy to, for example, physical index cards. In some of the examples below, "tasks" are alternatively referred to as "projects." However, the meanings are the same for the sake of this disclosure and the appended claims.

Aside from incorporating task management into the core of a search-ecosystem UI, another feature of a search-ecosystem UI of the present disclosure is providing means that allow users to track progress on these tasks implicitly. Rather than requiring users to make estimations about task progress and record task findings separately, some embodiments of a search-ecosystem UI of the present disclosure incorporate a number of explicit and implicit ways for user to track progress. This tracking can be instantiated through individual queries that users perform. Users can pick out useful sources of information through starring, saving potentially good ones for later reading, and/or trashing useless information sources, among other actions. Some embodiments of a search-ecosystem UI of the present disclosure surface how far down a user has scrolled within an item (e.g., a webpage) returned as a search result and how long they have spent on the item through one or more visualizations displayed in conjunction with the search-result item. With this feature, users can quickly glance at the visualization(s) to get an idea about how much information they have processed from a particular search result. Part of this information may also be shown on an interactive workspace screen so that users can quickly know which subtasks they need to continue working on and which ones are mainly complete.

In some embodiments, an interactive workspace of a search-ecosystem UI of the present disclosure can also allow people to progressively collect and organize information from the search-results items (e.g., webpages) that are looked at. For example, users can quickly clip parts of search-results items (e.g., by normal text selection or by gestures such as pinching or sliding right to select the appropriate amount of text or dropping "stickers" [i.e., icons with preset or user-defined meanings, such as emojis or tags] onto parts of the page), and those clips can be surfaced on a task-card view or interactive-workspace view, and/or as a separate notes organizer view. In some embodiments, users can select important pages, either through the explicit star and/or to-read actions or through implicit actions such as spending a relatively large amount of time on a page or having it be the last page visited in this search. A search-ecosystem UI of the present disclosure can then surface those important pages on a task-card view and/or interactive-workspace view. This allows the user to easily see an overview of and get back to search-result items they found useful.

In some embodiments, search-result items, interactive workspaces, and task cards can be shared and collaborated on by multiple users on separate computer devices. These individuals may either choose to explicitly share and collaborate with each other or to implicitly share by setting permissions (e.g., anyone in an organization) or making them public (e.g., anyone in the world). Users, for example, can be notified of each other's activity, can set actions for others (e.g., to look at a certain search, search-result item, or clip), and chat with each other synchronously or asynchronously. For example, a user might research a trip to Toronto, share that with his partner, and afterwards open it up publicly so that others can reuse and add to it.

A search-ecosystem UI of the present disclosure can be instantiated in any one of a variety of forms depending on the nature of the computer system and the nature of software that may be used in conjunction with the search-ecosystem UI. For example, the computer system at issue may be a standalone computer, such as a desktop computer, a laptop computer, a table computer, a smartphone, a smartwatch or other wearable computer system, etc., may be a mainframe computer system, may be a server-based computer system, may be a network computer system composed over a network such as a local-area network (LAN), a wide-area network (WAN), a global network (e.g., the Internet), and any combination thereof, or may be a computer system composed over a plurality of networks, including one or more wired (including optic fiber) networks and/or one or more wireless networks, such as cell networks, among others. Fundamentally, there is no limitation on the type of computer system on which a search-ecosystem UI can be implemented, other than that the computer system must be capable of providing the requisite computing power, contain searchable information, have one or more search tools for searching the searchable information, and be able to display, typically visually via one or more graphical UIs (GUIs), features of the search-ecosystem UI to at least one user. Consequently, the instantiations can range, for example, from standalone software applications (apps) (e.g., browser applications for specific computing devices, such as desktop computers, laptop computer, tablet computers, smartphones, smartwatches, other wearable computers, etc.), to plugin modules for existing software, such as conventional web browsers, database frontends, to code modules integrated directly into software, such as browser applications and database frontends, among others.

The diversity of computing environments in which a search-ecosystem UI of the present disclosure, the type(s) of search tool(s), can vary. For example, in web-based implementations, one or more of the search tools may be one or more web search engines, one or more website search engines, one or more server search engines, one or more desktop search engines, one or more metasearch engines, one or more database frontends, one or more topic-specific search tools (e.g., accountancy search tools, business search tools, computer search tools, education search tools, enterprise search tools, food/recipe search tools, genealogy search tools, jewelry search tools, employment search tools, legal search tools, medical search tools, news search tools, people search tools, real estate/property search tools, television search tools, etc.). Those skilled in the art will readily appreciate that the foregoing list of search tools is merely exemplary and that there are many other search tools that can be used in conjunction with a search-ecosystem UI of the present disclosure. Fundamentally, there is no limitation on the type of search tool other than that it is responsive to one or more user input or selected search queries to provide search results from querying one or more databases containing searchable information, including indexes of information stored in other databases. Example instantiations of search-ecosystem UIs of the present disclosure described below are implemented in a World-Wide-Web scenario for convenience. However, those skilled in the art will readily be able to adapt the overarching features and functionalities to any other suitable type of implementation, including website-specific implementations (i.e., searching only on a certain website), computing-device-specific implementations (e.g., searching only on a single device, such as a smartphone, tablet computer, laptop computer, desktop computer, server, mainframe, etc.), and network-specific implementations (e.g., searching only on a LAN or WAN, etc.), among others.

In some embodiments, a search-ecosystem UI of the present disclosure provides search results in one or more interactive workspaces that allow a user to interact with search-results items within the search results in any one or more of a variety of ways, track a user's interaction with search-results items, and visualize user interaction(s) with the search-results items. In the present context, and in the appended claims, the term "interactive workspace" is intended, at a minimum, to mean GUI that allows a user to interact with individual items within search results in one or more ways beyond the way in which the user could interact with a conventional static search-result list. For example, a conventional web search engine typically provides a static list of search results containing multiple items, each of which includes one or more hyperlinks linking to a webpage or other source of information. With such conventional static lists, generally the only interaction the user can have is to select one or more of the hyperlinks. After selection of a hyperlink, the web browser linking the user to the search engine typically changes the color of the hyperlink to indicate that the user had previously selected that hyperlink. In contrast, a workspace of the present disclosure provides one or more features and/or functionalities beyond hyperlink linking and hyperlink color changing. Examples of such additional features and functionalities include, but are not limited to: tagging list items (e.g., for flagging, for ranking, for deletion, for moving, etc.); deleting list items (e.g., by swiping, dragging, "right-clicking," reordering list items (e.g., by dragging); annotating list items (e.g., setting flags, setting colors, adding notes, setting importance indicator (e.g., selecting one or more stars or other indicator); tracking user interaction with list items (e.g., tracking number of times selected, tracking time spent in linked item, such as on a linked page, tracking selections of links on a linked page, etc.); and displaying information in association with list items (e.g., rankings, followup indicators, to-be-read indicators, indications of read status, interaction indicators (e.g., differing colors based on amounts of interaction, varying-extent visual indicators (e.g., progress bars) indicating amount of interaction (e.g., time, number of clicks, etc.)), among others. In some embodiments, a workspace of a search-ecosystem UI of the present disclosure may include one or more functionalities embodied in user interfaces (e.g., inboxes) of one or more types of messaging apps, such as texting apps and email apps, among others. Some example features and functionalities of workspaces of the present disclosure are described below and shown in the accompanying drawings.

In some embodiments, a search-ecosystem UI of the present disclosure allows a user to create one or more task cards that each provide one or more features for conducting one or more searches relating to a task (project) a user associates with that task card, to interact with the task card(s), and to organize multiple search cards. In some embodiments, search results can be obtained from any one or more search tools, including search tools that search results of searches previously conducted using a search-ecosystem UI of the present disclosure. In some embodiments, a multi-user search-ecosystem-UI system can be implemented among a plurality of users and allow users to share task cards, to contribute to group task cards, and/or to annotate their own task cards and/or task cards of others, among other functionalities. In other aspects, the present disclosure is directed to software and data structures for implementing any of the search-ecosystem UIs and/or multi-user task-centric systems made in accordance with the present disclosure. These and other aspects and embodiment are described below in detail or would be apparent to those skilled in the art from reading this entire disclosure. Examples of many of these aspects and embodiments are described below and illustrated in the accompanying drawings for illustrative purposes.

Referring now to the drawings, FIG. 1 illustrates an example method 100 of providing a search-ecosystem UI to assist a user in searching information stored within a computer system and with managing results of the searching. Example method 100 may be executed in any suitable deployment of the search-ecosystem UI, such as via search-ecosystem-UI software 304 of deployment 300 of FIG. 3. It is noted that while a single user is referred to throughout this and other examples, as well as in the appended claims, those skilled in the art will readily understand that multiple users can contribute to performing a single method of the present disclosure. Referring again to FIG. 1, at block 105, the search-ecosystem UI displays a first search-query field configured to receive one or more search queries from the user. The first search-query field may be any type of search-query field, such as a field that allows the user to enter any desired search string for initiating a search conducted by any one or more search tools. The search string may be of any suitable nature, such as, for example, a natural language search string or a structured search string, depending on the configuration of the underlying search tool(s). In some embodiments, the first search-query field may be divided into multiple subfields, each of which may correspond to a fixed or user-selectable aspects of the target type of item to be searched. For example, target search items may be documents having an author list, publication date, title, abstract, and body, and multiple subfields may be provided for searching corresponding ones of these aspects. Such a search field may include any suitable related functionality, such as an automatic dropdown menu that dynamically suggests one or more search string as the user enters a search query and/or an initiated search control, among others. Those skilled in the art of conventional search tools will readily be able to implement a first search-query field in any of its many variations.

At block 110, the search-ecosystem UI receives a first search query input by the user into the first search-query field. As noted above, the search query may be of any type suitable for or required by the search tool(s) that will be used during the search. Depending on the configuration of the user interface that presents the first search-query field, the user may input the first search query in any one or more of a variety of ways, such as by typing via a hard or soft keyboard, via a speech-to-text UI, via point-and-click operations, via drag-and-drop operations, via tap-to-select operations, among many others. Fundamentally, there is no limitation on the manner by which a user may input the first search query into the first search-query field, other than limitations of the UI itself.

At block 115, the search-ecosystem UI sends the first search query to at least one search tool on the computer system. As described above, each of the one or more search tools may be any type of software-based search tool for searching information stored on a computer system. Again, examples of search tools include, but are not limited to, web search engines, website search engines, task-card search tools, and database front ends, among many others, including the others listed above. Those skilled in the art will readily understand how to configure the software underlying the search-ecosystem UI to allow the search-ecosystem UI to communicate the first search query to the appropriate search tool(s).

At block 120, the search-ecosystem UI receives a first set of search results from the at least one search tool in response to the first search query. Each search tool to which the search-ecosystem UI sent the first search query returns a set of search results each containing a list of one or more "hits," or items that satisfy the first search query to whatever criteria that search tool establishes for qualifying for query satisfaction. For example, for certain types of information and queries, a perfect match must exist for the search tool to identify a hit, whereas for other types of information and queries, whether or not any particular item qualifies as a hit may depend on one or more algorithms coded into the search tool. A non-limiting example of the former is a database front end, and a non-limiting example of the latter is a web search engine. Those skilled in the art will readily understand the various configurations of search tools, search algorithms, and manners in which hits are determined, such that a fuller explanation is not needed for those skilled in the art to understand the broad scope of aspects of the present invention. As those skilled in the art will readily appreciate, the first set of search results may include one or more lists of matching and/or related hits, i.e., items. Such items may take any of a variety of forms, depending on the information represented by the hit. As a common example in the context of a web search engine, each item may include one or more hyperlinks to a webpage or other web-based resource, perhaps accompanied by one or more excerpts from the webpage or other web-based resource showing one or more search terms that composed the first search query. Other types of search results may include items having one or more other formats appropriate to the type(s) of information underlying the individual items.

At block 125, the search-ecosystem UI stores the first set of search results in a workspace datastore as a first workspace list of first items. In one example, the workspace datastore comprises a data structure, such as a relational database or other type of database, suitable for enabling one or more workspace functionalities that 1) allow the user to manipulate and interact with the first items, 2) track user interaction with the first items, and 3) visualize user interaction with the first items. Examples of these and other workspace functionalities are described above and include, but are not limited to: tagging list items (e.g., for flagging, for ranking, for deletion, for moving, etc.); deleting list items (e.g., by swiping, dragging, "right-clicking," reordering list items (e.g., by dragging); annotating list items (e.g., setting flags, setting colors, adding notes, setting importance indicator (e.g., selecting one or more stars or other indicator); tracking user interaction with list items (e.g., tracking number of times selected, tracking time spent in linked item, such as on a linked page, tracking selections of links on a linked page, etc.); and displaying information in association with list items (e.g., rankings, followup indicators, to-be-read indicators, indications of read status, interaction indicators (e.g., differing colors based on amounts of interaction, varying-extent visual indicators (e.g., progress bars) indicating amount of interaction (e.g., time, number of clicks, etc.)), among others. As noted above, some example features and functionalities of workspaces of the present disclosure are described below and shown in the accompanying drawings. Those skilled in the art will readily understand how to implement a workspace datastore that provides one, some, or all of these workspace functionalities.

At block 130, the search-ecosystem UI displays the first workspace list to the user in an interactive workspace that works in conjunction with the workspace datastore to 1) allow the user to manipulate and interact with the first items in the interactive workspace, 2) track user interactions with the first items within the interactive workspace; and 3) visualize the interactions with the first items within the interactive workspace. Examples of user manipulations and interactions, tracking, and visualization are provided in the immediately preceding paragraph and elsewhere above. As also noted above, in some embodiments an interactive workspace of a search-ecosystem UI of the present disclosure may include one or more functionalities embodied in user interfaces (e.g., inboxes) of one or more types of messaging apps, such as texting apps and email apps, among others. The interactive workspace may be configured to allow a user to interact with items within the interactive workspace in any one or more of a variety of manners appropriate for the hardware on which the search-ecosystem UI is implemented.

For example, if the search-ecosystem UI is implemented on a touchscreen-based device (e.g., smartphone, smartwatch, tablet computer, or touchscreen-based laptop or desktop computer), then user interaction will typically be via gesturing and/or stylus inputs via the touchscreen. Single and multi-finger gesturing types are well-known in the art and need not be repeated here for those skilled in the art to understand how to implement gesture-based input schemes for touchscreen implementations of a search-ecosystem UI of the present disclosure. In addition, examples of various gesturing inputs are described below and shown in some of the appended drawings. Those examples are not intended to be exhaustive, but merely illustrative. As another example, if the search-ecosystem UI is implemented in a non-touchscreen environment, then user inputs for manipulation of and interaction with items within the interactive workspace may be made using one or more types of pointing and/or selecting devices, such as a computer mouse, a trackball device, a keyboard, and a digitizer tablet, among others.

In some embodiments, each interactive workspace can be associated with a corresponding task card, which the user may use to organize searching relating to, for example, a certain root topic. The term "task" in "task card" is intended to connote the action(s), or tasks, of searching for information relating to a particular root topic or project, and the term "card" is intended to conjure a physical analogy for an interactive workspace of the present disclosure based on certain attributes that an interactive workspace may have in at least some embodiments, such as looking generally like a card (e.g., when rendered on a smartphone display), being manipulatable (e.g., by gesturing) and displayable with like task cards in groups using an index-card and/or card-deck analogy, being sharable (e.g., like trading cards), etc. Of course, the task cards of the present disclosure are electronic and need not necessarily be visually rendered like any actual type of card; rather, the term "task card" is used for the sake of convenience to express underlying functionalities as described and illustrated herein and in the accompanying drawings.

A search-ecosystem UI of the present disclosure may associate an identifier for each interactive workspace, and corresponding task card, in any of a variety of ways. For example, when the user initiates a new interactive workspace for a new topic (task or project), the search-ecosystem UI may simply use the initial search query at the identifier for the interactive workspace. In this example, the interactive workspace may be provided with two search-query-input fields—one for initiating and identifying (e.g., naming) the interactive workspace (task card) and also for initiating the initial search for the new interactive workspace (task card). In this example, the second search-query-input field is an interactive-workspace- or task-card-specific search-query-input field that automatically associates any search results returned from a search initiated via this second search-query-input field with the current interactive workspace or task card. As another example, the search-ecosystem UI may include a workspace (task card) identification control (such as a name input field) that allows a user to input or otherwise select an identifier for a new interactive workspace or task card. In yet another example, the search-ecosystem UI of the present disclosure may use some other process for associating an identifier to a new interactive workspace (task card), such as using sequential identifiers or using an excerpt from search results resulting from a search initiated from the current interactive workspace or task card.

Figure 2:
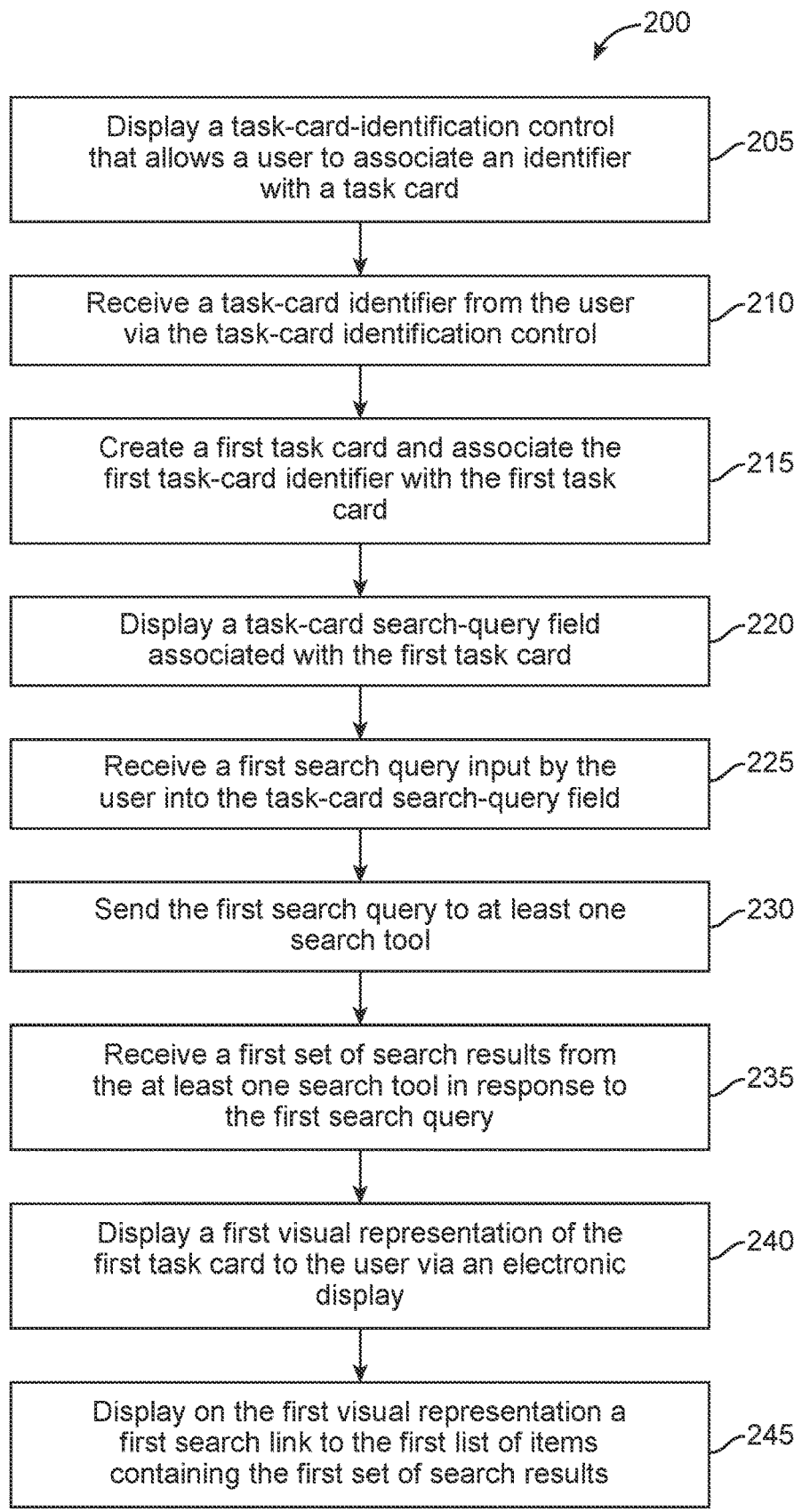
FIG. 2 is a flow diagram of an example method of providing a search-ecosystem UI that provides task-card functionality for assisting a user with searching.

FIG. 2 illustrates another example, method 200, of providing a search-ecosystem UI to assist a user in searching information stored within a computer system and in managing results of the searching. Example method 200 may be executed in any suitable deployment of the search-ecosystem UI, such as via search-ecosystem-UI software 304 of deployment 300 of FIG. 3. Whereas method 100 of FIG. 1 is directed more toward aspects of interactive workspace constructs and interactive-workspace functionalities of the present disclosure, method 200 of FIG. 2 is directed more toward aspects of task card constructs and corresponding functionalities. While in some embodiments interactive workspaces and task cards are effectively equivalent, in other embodiments they are not equivalent. Indeed, some embodiments of search-ecosystem UIs of the present disclosure may include only interactive-workspace functionalities, while other embodiments of search-ecosystem UIs of the present disclosure may include only task-card functionalities.

Referring to FIG. 2, at block 205, the search-ecosystem UI displays a task-card-identification control that allows a user to associate an identifier with a task card. The search-ecosystem UI may, for example, display the identifier in conjunction with the task card so that the user can readily associate the corresponding task card with a particular task the user has in mind. The task-card-identification control may be any suitable control that allows the user to enter, select, or otherwise input an identifier. Examples of a task-card-identification control include an alphanumeric input field (e.g., for receiving a text name or other string) and a selection control that allows a user to select one of a plurality of identifier choices, among others. In a specific example of the task-card-identification control being an alphanumeric input field, the task-card-identification control may be a search-query-input field, such as the search-query-input field of method 100 or another search-query-input field. In another specific example of task-card-identification control being an alphanumeric input field, the task-card-identification control may be a task-card-naming field provided solely for the purpose of allowing the user to input a task-card identifier. At block 210, the search-ecosystem UI receives a first task-card identifier from the user via the task-card-identification control.

At block 215, the search-ecosystem UI creates a first task card and associates the first task-card identifier with the first task card. It is noted that the creation of the first task card may be as simple as the search-ecosystem UI adding a new entry to a task-card datastore. An example of adding such a new entry may be adding a new task-card identifier to the task-card datastore or adding a flag to a task-card-valid field within the task-card datastore, among many other possibilities. Of course, other methods of creating a task card may be used as desired.

At block 220, the search-ecosystem UI displays a task-card search-query field associated with the first task card. The task-card search-query field allows a user to sequentially input one or more search queries that the user wants to be associated with the first task card. The task-card search-query field may be of any of the search-query fields described above, among others. In some embodiments, the task-card search-query field may be customizable, such as by allowing the user to select the type of search tool and/or a particular search tool of a certain type for a current search.

At block 225, the search-ecosystem UI receives a first search query input by the user into the task-card search-query field. As noted above, the search query may be of any type suitable for or required by the search tool(s) that will be used during the search. Depending on the configuration of the GUI that presents the task-card search-query field, the user may input the first search query in any one or more of a variety of ways, such as by typing via a hard or soft keyboard, via a speech-to-text UI, via point-and-click operations, via drag-and-drop operations, via tap-to-select operations, among many others. Fundamentally, there is no limitation on the manner by which a user may input the first search query into the task-card search-query field, other than limitations of the UI itself.

At block 230, the search-ecosystem UI sends the first search query to at least one search tool on the computer system. As described above, each of the one or more search tools may be any type of software-based search tool for searching information stored on a computer system. Again, examples of search tools include, but are not limited to, web search engines, website search engines, task-card search tools, and database front ends, among many others, including the others listed above. Those skilled in the art will readily understand how to configure the software underlying the search-ecosystem UI to allow the search-ecosystem UI to communicate the first search query to the appropriate search tool(s).

At block 235, the search-ecosystem UI receives a first set of search results from the at least one search tool in response to the first search query. Each search tool to which the search-ecosystem UI sent the first search query returns a set of search results each containing a list of one or more "hits," or items that satisfy the first search query to whatever criteria that search tool establishes for qualifying for query satisfaction. For example, for certain types of information and queries, a perfect match must exist for the search tool to identify a hit, whereas for other types of information and queries, whether or not any particular item qualifies as a hit may depend on one or more algorithms coded into the search tool. A non-limiting example of the former is a database front end, and a non-limiting example of the latter is a web search engine. Those skilled in the art will readily understand the various configurations of search tools, search algorithms, and manners in which hits are determined, such that a fuller explanation is not needed for those skilled in the art to understand the broad scope of aspects of the present invention. As those skilled in the art will readily appreciate, the first set of search results may include one or more lists of matching and/or related hits, i.e., items. Such items may take any of a variety of forms, depending on the information represented by the hit. As a common example in the context of a web search engine, each item may include one or more hyperlinks to a webpage or other web-based resource, perhaps accompanied by one or more excerpts from the webpage or other web-based resource showing one or more search terms that composed the first search query. Other types of search results may include items having one or more other formats appropriate to the type(s) of information underlying the individual items.

At block 240, the search-ecosystem UI displays a first visual representation of the first task card to the user via an electronic display, which may be, for example, a visual display of a computing device the user is using, such as a smartphone, tablet computer, smartwatch, laptop computer, desktop computer, computer workstation, etc. Depending on the type and/or form factor of electronic display, the first visual representation may occupy the entire display space of the electronic display or occupy only a portion of the entire display space, such as in a browser window, pop-up window, or other type of window, among other display means. In some embodiments, the first visualization may resemble a conventional physical card of one type or another, such as a playing card, index card, or the like. In some embodiments, the first visualization may not resemble any type of conventional physical cards but merely have one or more of the task-card functionalities described herein.

At block 245, the search-ecosystem UI displays on the first visual representation a first search link to the first list of items containing the first set of search results. In one example, the first search link includes the first search query. The displaying of the first search link on the first visual representation of the first task card allows the user to selectively access the first list of items containing the first set of search results by simply selecting the first search link using any suitable hyperlink selecting process, such as tapping (e.g., via a touchscreen) or pointing and clicking (e.g., using a computer mouse, trackball, etc.), among others. In response to the user selecting the first search link, the search-ecosystem UI may, for example, display the first list on the first visual representation of the task card, open a new window and display the first list in the new window, or replace the first visual representation with the first list of items, among other options.

When the search-ecosystem UI receives the first set of search results from the corresponding search tool, it may store the first set of search results in a task-card datastore as the first list of items. Such a task-card datastore may be configured to enable any one or more of various task-card functionalities described herein, such as allowing the user to add one or more additional sets of search results, allowing the user to retrieve the search results without needing to resend a search query to a search tool, allowing multiple users to share one or more of their task cards, allowing one or more other users to add search results to another creator's task card, and tracking changes made to each task card by one or more users, among others. When a user, such as a task-card's creator, conducts a second or subsequent search via task-card search-query field, the search-ecosystem UI may add a corresponding hyperlink to the visualization of the task card to allow a user to easily access the respective list of items from the corresponding set of search results. As noted above, each task card may be enabled with one or more of the interactive-workspace functionalities discussed above, such that the task-card datastore effectively becomes an interactive-workspace datastore.

Upon reading this entire disclosure, those skilled in the art will readily understand that methods 100 and 200 of FIGS. 1 and 2, respectively, are merely examples and that many other unique methods are disclosed herein either explicitly or implicitly by virtue of the functionalities disclosed herein and the knowledge of those having ordinary skill in the art that allows such artisans to program these functionalities into deployable software.

Figure 3:
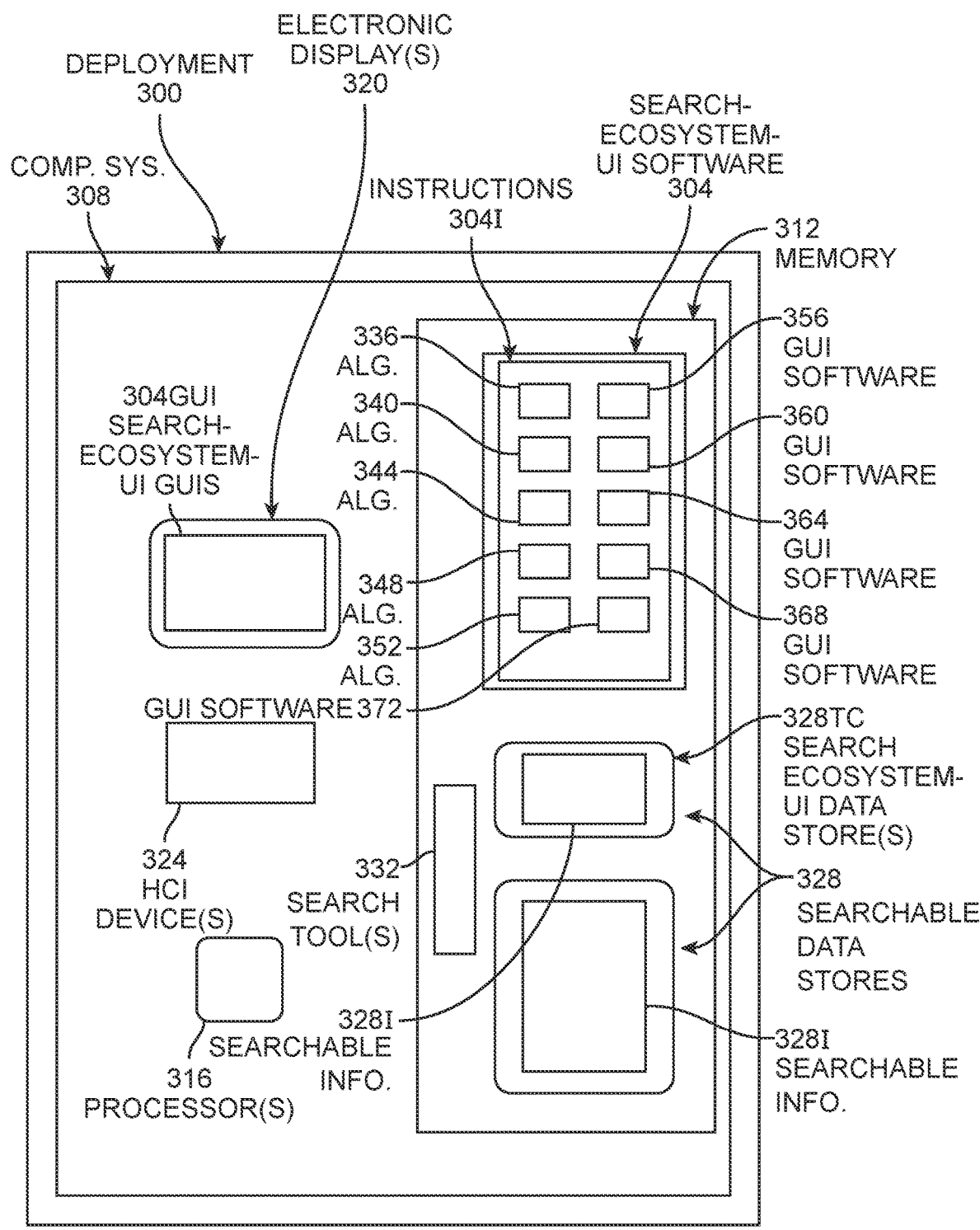
FIG. 3 is high-level block diagram of an example deployment of search-ecosystem UI software of the present disclosure.

FIG. 3 illustrates an example deployment 300 of search-ecosystem UI software 304 made in accordance with aspects of the present invention. Search-ecosystem UI software 304 can be configured to perform each of methods 100 and 200 of FIGS. 1 and 2, respectively, among many other methods disclosed herein either explicitly or implicitly. Referring to FIG. 3, in deployment 300 search-ecosystem UI software 304 may include any or all of the functionalities described in this disclosure. It is emphasized that deployment 300 is merely illustrative and that there are many other deployments, such as deployments deployed in other hardware environments (e.g., device based, network based, cloud-computing based, multi-user based, single-user based). Those skilled in the art will readily understand how to not only configure search-ecosystem UI software 304 for use in any type of hardware environment but will also understand how to effect deployment of the software to the target environment. In addition, it is noted that while search-ecosystem UI software 304 is referred to as a unitary piece of software, this is not to imply that the software cannot be deployed as pieces of software (e.g., modules, etc.) that are separate and distinct from one another. On the contrary, the term "search-ecosystem UI software" is used for convenience only to agglomerate various functionalities with one another.

In the example of FIG. 3, deployment 300 includes a computer system 308 that executes computer-executable instructions 3041 contained in search-ecosystem UI software 304. As noted above, computer system 308 may take any of many differing forms, ranging from a standalone computer system, such as a desktop computer, laptop computer, tablet computer, smartphone, smartwatch, etc., to a LAN-based computer system to a WAN- or global-area-network-based computer system, such as an Internet-based computer system, with local and/or distributed computing functionality. Computer system 308 includes memory 312 that stores, among other things, computer-executable instructions 3041, and one or more processors 316 that execute, among other things, such computer-executable instructions. For the sake of convenience because of the multitude of forms of memory used in computer systems, memory 312 collectively represents any and all types of machine memory (i.e., not transitory signals) used by processor(s) 316 and computer system 308 more generally, to carry out all functionality of the computer system. Consequently, memory 312 may include any one or more forms of non-volatile memory (e.g., non-volatile storage memory and non-volatile memory, including non-volatile main memory) and/or any one or more forms of volatile memory (e.g., static random-access memory (RAM), dynamic RAM, etc.), among others. Fundamentally, there is no limitation on the type of machine memory that can be used as or be part of memory 312.

Deployment 300 includes one or more electronic displays 320 (only one shown for convenience) each for displaying one or more GUIs and/or portion(s) thereof of search-ecosystem UI software 304. Each electronic display 320 may be based on any suitable display technology, such as LED, LCD, or plasma, among others. Fundamentally, there is no limitation on the type of each electronic display 320 as long as it allows a user to view the appropriate search-ecosystem UI GUI(s) or portion(s) thereof (collectively illustrated at element 304GUI on electronic display 320), including any image(s) displayed thereby. It is noted that in the appended claims, the use of the term "electronic display" denotes not only a single display, but also multiple displays that a user may use to view any one or more GUIs of search-ecosystem UI 304. This is in recognition of current common practices of using multiple electronic displays (e.g., computer monitors) at a single workstation and of using large mosaicked displays made of multiple display tiles. Any one or more of electronic displays 320 may be touchscreen enabled using any suitable touchscreen technology. Such touchscreen technology may be used as a human-computer interaction (HCI) interface for search-ecosystem UI software 304 to allow the user to interact with the software using suitable gesturing. Each electronic display 320 may be associated with one or more HCI devices 324 other than a touchscreen, such as a computer mouse, a trackball, a tablet-input device, among others.

In this example, deployment 300 includes one or more searchable datastores 328 each containing information that can be searched via one or more search tools 332. For the sake of this disclosure, each searchable datastore 328 may be considered as containing or potentially containing at least one item of searchable information 3281 that any one or more of search tools 332 may return as a result of a search initiated by a user via search-ecosystem UI software 304. As alluded to above, searchable information 3281 may take any of a variety of forms depending on the type of the corresponding datastore(s) 328 and/or context of deployment. Examples of datastores 328 range from information contained in non-volatile memory (e.g., a hard drive) of a computing device, to one or more databases contained on one or more computing devices, such as one or more databases stored on a mainframe computer, a web server, a web server farm, among others, and any combination thereof, to one or more search-ecosystem UI datastores, such as search-ecosystem UI datastore 328TC that stores data that underlies the various functionalities of the search-ecosystem UI provided by search-ecosystem UI software 304. Some non-limiting examples of datatypes that a search-ecosystem UI datastore of the present disclosure, such as task-centric datastore 328TC, may contain are described below in the section titled "EXAMPLE DATATYPES". Regarding the one or more search tools 332, each search tool may be any of a variety of types, such as the types described above, which include but are not limited to a web search engine, a website search engine, a server search engine, a database front end, or a topic-specific search tool, among others.

In example deployment 300, search-ecosystem UI software 304 is configured to execute any one or more of a variety of algorithms that perform the corresponding respective functionalities described above, depending on the nature of the deployment. Examples of algorithms encoded into search-ecosystem UI software 304 include: one or more user-interaction tracking algorithms 336 that track each user's interaction with search-result items, one or more user-interaction visualization algorithms 340 that visualize tracked user interactions, one or more task-card algorithms 344 that provide task-card functionalities, one or more interactive-workspace algorithms 348 that provide interactive-workspace functionalities (other than user-interaction tracking), and one or more sharing algorithms 352 that allow multiple users to share task-cards, interactive workspaces, and/or search-results items across multiple computer devices and/or user accounts and to interact with task-cards, interactive workspaces, and/or search-results items shared by other users, among others.

In example deployment 300, search-ecosystem UI software 304 is also configured to include a variety of GUI software that allow a user to interact with various functionalities of the search-ecosystem UI software. Examples of GUI modules that search-ecosystem UI software 304 includes are: task-card GUI software 356 that displays task cards individually and/or in groups (at differing times) and allows one or more users to interact therewith, interactive-workspace GUI software 360 that displays one or more interactive workspaces for search results, item-view GUI software 364 for displaying individual search-results items and allowing one or more users to interact therewith, notes GUI software 368 that displays one or more user notes and allows one or more users to interact therewith, and group-share GUI software 372 that provides user-functionalities for group sharing of and/or group interaction with task-cards, interactive workspaces, and/or search-results items, among others.

As those skilled in the art will readily appreciate, the foregoing example algorithms 336, 340, 344, 348, and 352 and GUI software 356, 360, 364, 368, and 372 of search-ecosystem UI software 304 interact with various physical components of deployment 300, such as memory 312, processor(s) 316, electronic display(s) 320, and HCI device (s) 324, as well as any one or more of searchable datastore(s) 328, search-ecosystem UI datastore(s) 328TC, and any other datastores (not illustrated) using known computer-programming techniques that need not be elaborated upon here for those skilled in the art to understand how to implement the many novel features, aspects, and functionalities disclosed herein.

Those skilled in the art will readily appreciate that although task-centric software 304 is typically executed on conventional computing hardware, the execution of this specialized software and its unique algorithm, GUIs, and functionalities, transforms such conventional hardware into a specialized hardware+software-based search-ecosystem UI system that provides one or more users with one or more of the functionalities described herein. As described above and as those skilled in the art will readily understand, each of these systems provides certain technological improvements over conventional search-task management techniques.

Example Instantiations

FIGS. 4 to 10 illustrate several example instantiations of search-ecosystem UIs made in accordance with the present disclosure. Those skilled in the art will readily understand that these examples are merely illustrative of various features and functionalities described above and that these and other features and functionalities described herein can be implemented in many other ways. It is noted that all of these example instantiations are presented in the context of smartphone implementations. However, those skilled in the art will also understand that, as described above, smartphone implementations are merely one of many types of implementations for search-ecosystem UIs of the present disclosure and that programmers of ordinary skill in the art can adapt search-ecosystem UIs of the present disclosure to any type of computing device and computing environment.

Figure 4:
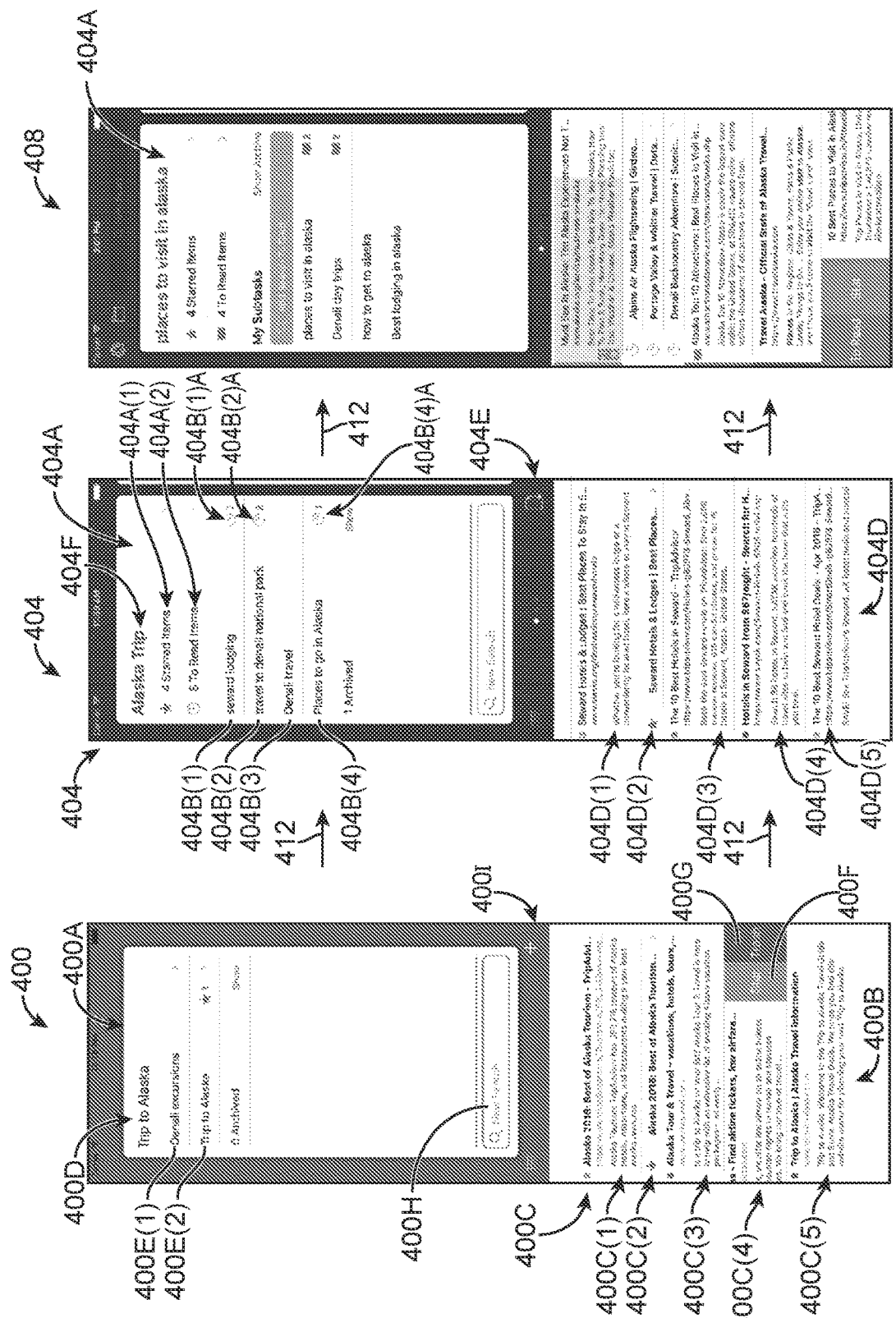
FIG. 4 contains a set of screenshots illustrating differing example instantiations of search-ecosystem UIs of the present disclosure.

Referring now to FIG. 4, this figure shows three instantiations of search-ecosystem UIs 400, 404, and 408 that represent an evolution over development time, with arrows 412 representing progression from one instantiation to the next. Search-ecosystem UI 400 includes a task-card visual representation 400A as a homescreen of sorts and an interactive workspace 400B that displays a workspace list 400C of items from a search. In search-ecosystem UI 400, task-card visual representation 400A is relatively basic, showing a task-card identifier 400D and one or more search-results links to corresponding search results, here two such search-results links 400E(1) and 400E(2), that when selected take the user to an interactive workspace, such as interactive workspace 400B, which is for the "Trip to Alaska" link. In this example, each search-results link 400E(1) and 400E(2) includes an identifier for the corresponding interactive workspace. Here, these identifiers are the search queries that the user used to perform the corresponding search. As seen in interactive workspace 400B, when the user slides an item, here item 400C(4), to the left using a gesture, search-ecosystem UI 400 provides the user with two options, a star option 400F that allows the user to add a star next to the item (see item 400C(2)) and a trash option 400G that allows the user to remove an item from list 400C. In this instantiation, task-card visualization 400A provides information about the interactive workspaces, including interactive workspace 400B, associated with this task card. In this example, task-card visualization 400A shows interactive workspace 400B as having one starred search-results item in list 400C. Also in this example, search-ecosystem UI 400 includes a single search-query-input field 400H that the user uses to add a new search to the task card and further includes an add-new-task-card control 400I that a user selects when they want to start a new task card. Although not shown, search-ecosystem UI 400 displays a name-task-card field that allows a user to input an identifier (see, e.g., task-card identifier 400D) for the new task card.

Search-ecosystem UI 404 has a number of features in common with search-ecosystem UI 400, but it also has a number of additional features. For example, search-ecosystem UI includes a meta-view 404A that summarizes information about all of the interactive workspaces (not shown) associated with this task card. Here, those interactive workspaces correspond to the four searches associated with the task card, as indicated by the four search-results links 404B(1) to 404B(4), and contain corresponding respective lists of items returned by the corresponding searches. In this example, meta-view 404A shows at a summary link 404A(1) that there is a total of four items that the user has starred throughout all four interactive workspaces, and at summary link 404A(2) that there is a total of five items that the user has flagged for reading. When the user selects summary link 404A(1), search-ecosystem UI 404 displays the four starred items (not shown) in isolation from all other search result items. Similarly, when the user selects summary link 404A(2), search-ecosystem UI 404 displays the five items flagged to be read in isolation from all other search result items. These summary links 404A(1) and 404A(2) give the user quick access to the item(s) the user has deemed important. In this example, each of search-results links 404B(1), 404B(2), and 404B(4) includes a corresponding indicator 404B(1)A, 404B(2)A, and 404B(4)A that shows how many of the items in the corresponding list of search results the user has marked to be read. As indicated in workspace 404D by the one bolded item 404D(4) out of items 404D(1) to 404D(5), the user has not yet read item 404D(4), since in this example, search-ecosystem UI 404 initially presents all items in bold text and then removes the bolding from each item as the user reads that item. Like search-ecosystem UI 400, search-ecosystem UI also includes an add-new-task-card control 404E. However, add-new-task-card control 404E is represented by a different icon relative to add-new-task-card control 400I. Search-ecosystem UI 404 also includes a task-card indicator 404F that shows the user which task card they are on in a series of task cards. In this instantiation, the user can switch task cards by swiping left and right, depending on where the current task card is in the series of task cards.

Figures 5A, 5B:
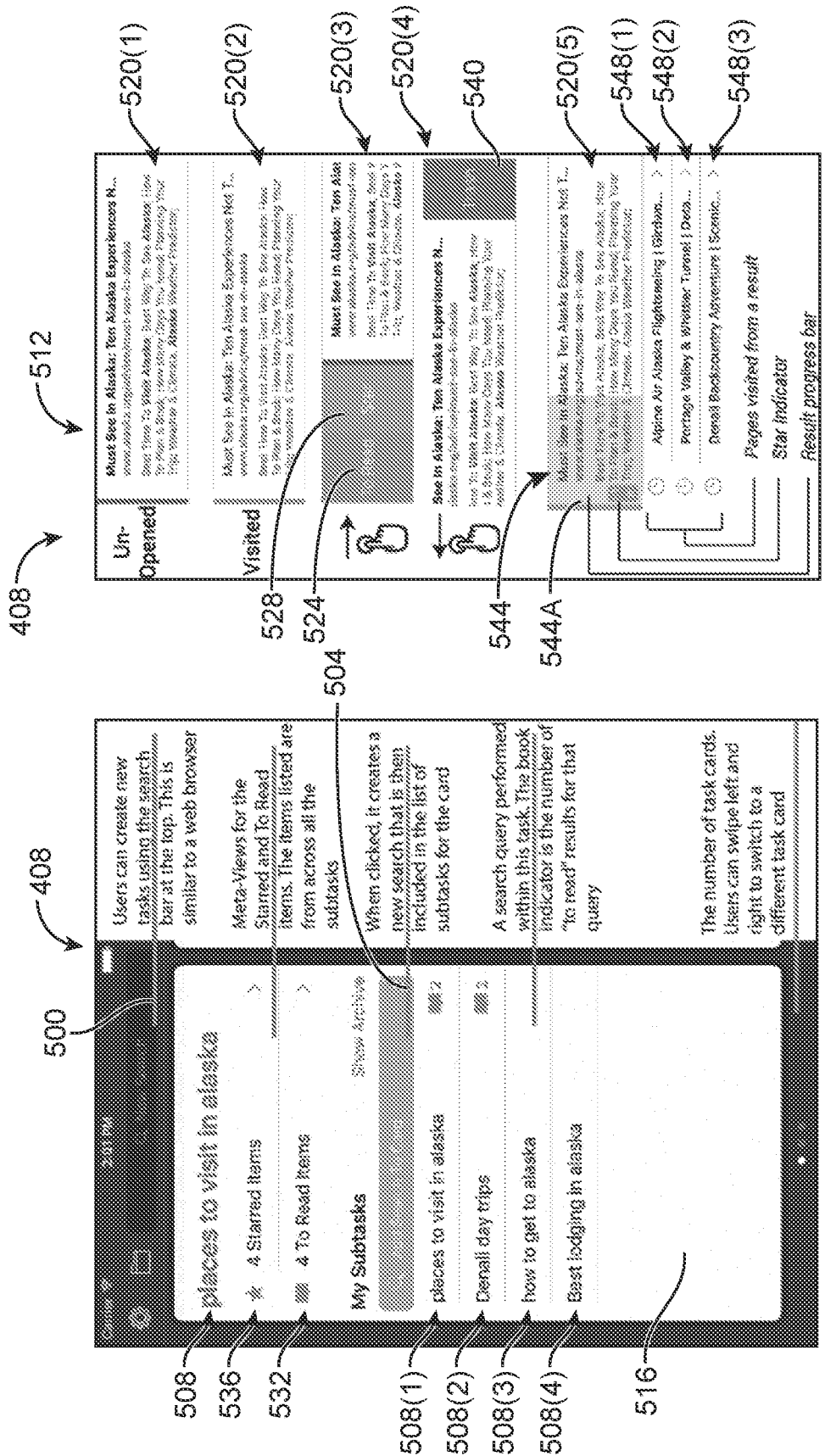
FIG. 5A is a screenshot of a task-card graphical UI (GUI) of the third search-ecosystem UI of FIG. 4.
FIG. 5B is a screenshot of an interactive-workspace GUI of the third search-ecosystem UI of FIG. 4.

Still referring to FIG. 4, search-ecosystem UI 408 includes some features that are the same as or similar to features of search-ecosystem UI 404, but it also includes some additional features. FIG. 5A also shows search-ecosystem UI 408, and reference will now be made to FIGS. 5A and 5B for explaining some of the additional features. Referring primarily to FIGS. 5A and 5B, and to FIG. 4 as noted, one difference between search-ecosystem UI 408 and each of search-ecosystem UIs 400 and 404 (FIG. 4) is that search-ecosystem UI 408 of FIG. 5A includes two search-query-input fields 500 and 504. In this example, search-query-input field 500 allows the user to initiate a new search that also initiates a new task card. In this embodiment, search-ecosystem UI 408, upon the user initiating a search, makes the search query the user enters into search-query-input field 500 the task-card identifier 508 (here, "places to visit in alaska") while also adding a search link 508(1) to an interactive workspace, for example, interactive workspace 512 of FIG. 5B, having the same identifier, i.e., "places to visit in alaska". In contrast, search-query-input field 504 may have the same search functionality of search-query-input field 500, but rather than initiating a new task card in response to a search initiation, it adds another search link (here, e.g., any one of additional search links 508(2) to 508(4)) to the visual representation 516 of the task card.

As seen in FIG. 5B, in this example interactive workspace 512 includes a number of interactive functionalities. For example, the user can easily see at a glance which one(s) of the search result items, here items 520(1) to 520(5) displayed in the interactive workspace they have opened or visited. In this case, all unopened or unvisited search results items, here items 520(1), 520(3), and 520(4) include bolded text, while all opened or visited search result items, here, items 520(2) and 520(5), have the previously bolded text switched to unbolded text. Example interactive workspace 512 also includes various "swipe to reveal option(s)" features. As illustrated with search-result item 520(3), a swiping gesture to the right reveals a "To Read" control 524 and a "Star" control 528 that allows a user to, respectively, select whether to add the corresponding item to a "To Read Items" list (see, "To Read Items" link 532 in FIG. 5A) and select whether to add the corresponding item to a "Starred Items" list (see, "Starred Items" link 536 in FIG. 5A). As illustrated with search-result item 520(4), a swiping gesture to the left reveals a "Trash" control 540 that allows a user to remove the corresponding item from interactive workspace 512.

Several additional functionalities of interactive workspace 512 are illustrated relative to search-results item 520(5). For example, search-results item 520(5) is displayed over an interaction visual indicator, here, a progress bar 544, that visually indicates to the user how much they have interacted with this search-result item. In this example, progress bar 544 is initially completely transparent or colorless. As the user interacts with search-results item 520(5), for example, scrolls within a page linked from the search-results item, stares at such a linked page, and/or selects links (e.g., links 548(1) to 548(3)) embedded with the linked page, etc., search-ecosystem UI 408 adds shading 544A to progress bar 544 in an amount that represents the interaction(s). In this example, shading 544A is a transparent gray and search-ecosystem UI 408 adds the shading from left to right. However, in other embodiments the shading may be different and/or added in a different way. As noted above, a progress bar, such as progress bar 544, is but one type of varying-extent visual indicator that can be used to indicate the amount of interaction the user has with a particular search-results item. Another functionality that interactive workspace 512 provides in this example is an indication, here, a list of embedded links 548(1) to 548(3), that the user has accessed from the page linked from search-results item 520(5). Among other things, displaying previously accessed embedded links 548(1) to 548(3) in this manner allows a user to quickly revisit those links without having to reopen the main page linked from search-results item 520(5). In this example, search-ecosystem UI 512 updates progress bar 544 based on any further interaction with the one or more pages (not shown) when accessed via displayed previously accessed embedded links 548(1) to 548(3). Other features and functionalities of search-ecosystem UI 408 illustrated in FIGS. 5A and 5B but not described may be the same as or similar to like features and functionalities described relative to search-ecosystem UIs 400 and 404 of FIG. 4.

Figure 6:
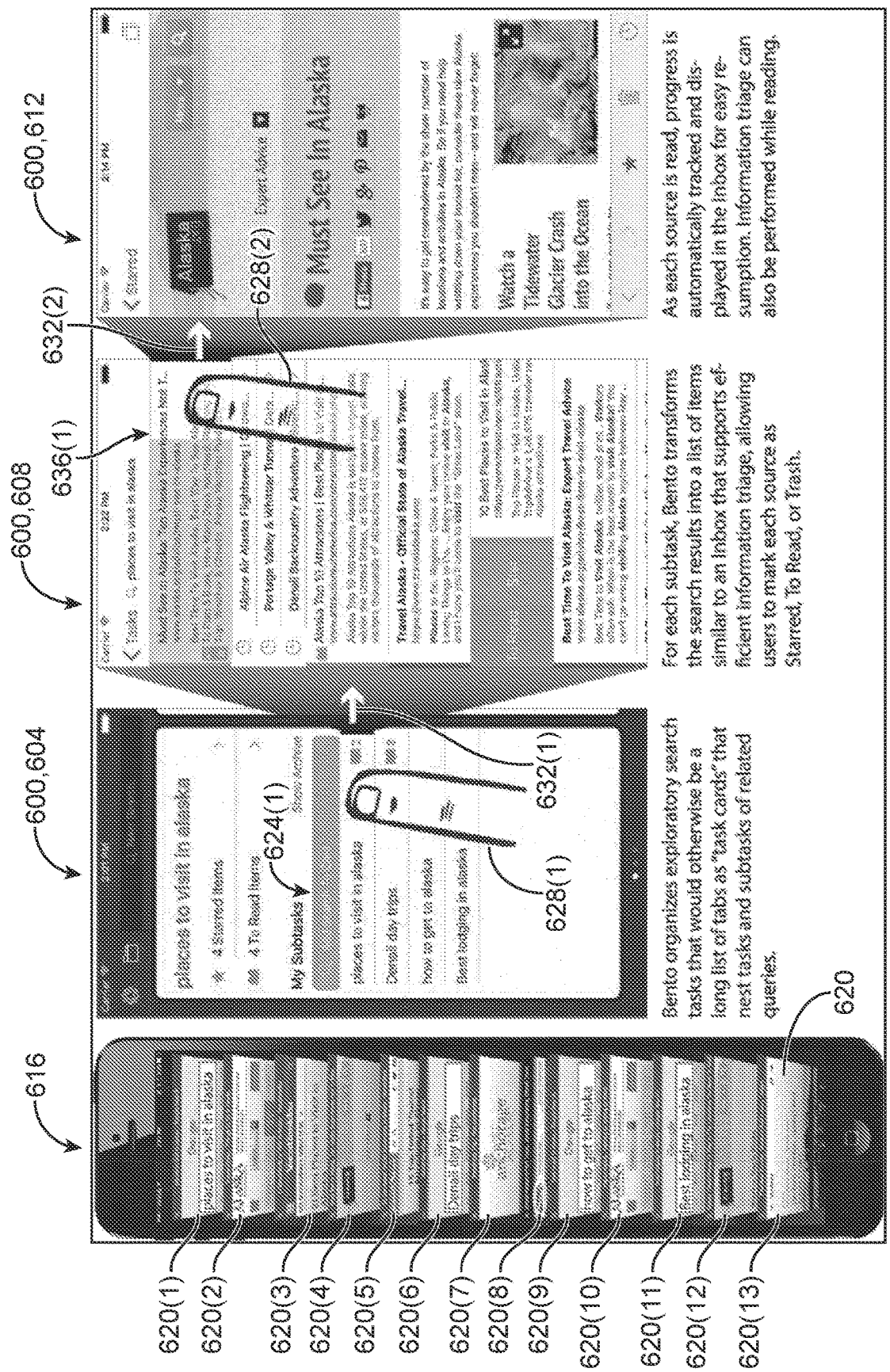
FIG. 6 is a set of screenshots illustrating a task-card GUI, an interactive-workspace GUI, and a search-results-item GUI of a search-ecosystem UI of the present disclosure contrasted against a caricatured smartphone web-browser GUI displaying a rolodex arrangement of partially collapsed browser windows generally corresponding to the searches/results contained in the search-ecosystem UI of the other GUIs in FIG. 6.

FIG. 6 illustrates, for comparison sake, a search-ecosystem UI 600 of the present disclosure in screenshots 604, 608, and 612 and a distorted rendering 616 of a conventional smartphone browser 620. Generally, the rolodex arrangement of partially collapsed browser windows 620(1) to 620(13) in distorted rendering 616 represent how a user would conduct, using conventional smartphone browser 620, the searching equivalent to the searching using search-ecosystem UI 600 illustrated in screenshots 604, 608, and 612. As can be readily seen comparing distorted rendering 616 to screenshots 604, 608, and 612, search-ecosystem UI 600 brings significant organizational and functional improvements to searching using conventional smartphone browser 620. As can be seen from comparing screenshots 604 and 608 to FIGS. 5A and 5B, respectively, search-ecosystem UI 600 is substantially similar to search-ecosystem UI 408. Screenshot 608 is a screenshot of search-ecosystem UI 600 after the user has selected search link 624(1) (as illustrated by finger 628(1) and sequence arrow 632(1)), and screenshot 612 is a screenshot of the search-ecosystem UI after the user has selected search-results item 636(1) (as illustrated by finger 628(2) and sequence arrow 632(2)). Features and functionalities of search-ecosystem UI 600 not described may be the same as or similar to features and functionalities of search-ecosystem UI 408 of FIGS. 5A and 5B.

Figure 7D:
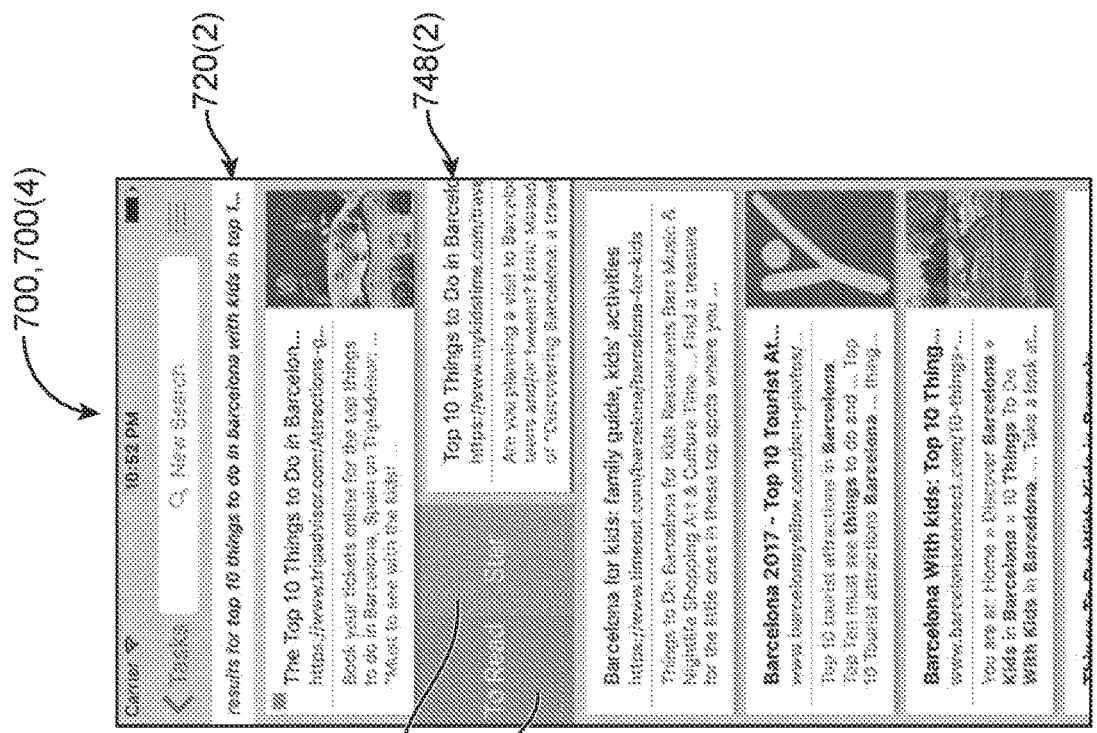
FIG. 7D is a screenshot of the interactive-workspace GUI of FIG. 7B, illustrating various additional interactive-workspace functionalities.

FIGS. 7A to 7F illustrate another example instantiation of a search-ecosystem UI 700 of the present disclosure. It is noted that FIGS. 7A to 7E are full or nearly full screenshots 700(1) to 700(6) of search-ecosystem UI 700 as displayed on a smartphone (not shown). Screenshot 700(1) of FIG. 7A shows a visual representation 704 of a task card, here a task card having "barcelona day trips" as its identifier 708, and this task card has associated therewith three sets of search results represented by search tiles 712(1) to 712(3). In this example, each search tile 712(1) to 712(3) has a corresponding interaction visual indicator 716(1) to 716(3) that indicates the relative amount of interaction the user has had with the corresponding interactive workspace (e.g., interactive workspace 720 of FIG. 7B) as well as measures of how many starred items and to-be-read items are in that interactive workspace. In this example, the total number of vertical bars in each interaction visual indicator 716(1) to 716(3) indicates relative interaction, while vertical bars of a particular color or shade indicate the number of starred items and vertical bars of a different color or shade indicate the number of to-be-read items. User selection of any one of search tiles 712(1) to 713(3) takes the user to a corresponding interactive-workspace screen, such as interactive-workspace screen 720(1) of FIG. 7B.

Referring to FIG. 7B, interactive-workspace screen 720(1) includes a workspace identifier 724 that shows which search results (i.e., interactive workspace) the user is currently in. Here, the user is viewing results from the "girona spain" search results (see search-results tile 712(1) of FIG. 7A) of the "barcelona day trips" task card (see task card visual representation 704 of FIG. 7A). Interactive-workspace screen 720(1) of FIG. 7B shows five full search-results items 728(1) to 728(5), with the user having opened search-results items 728(1) to 728(3) (no bolded text; see search-results items 728(4) and 728(5) for comparison), having starred search-results item 728(1), and having tagged search results items 728(2) and 728(3) as to be read. Search-results item 728(1) also includes an interaction visual indicator, here a "progress bar" indicator 732 located at the bottom of the search-results item display box 736.

Figure 7C:
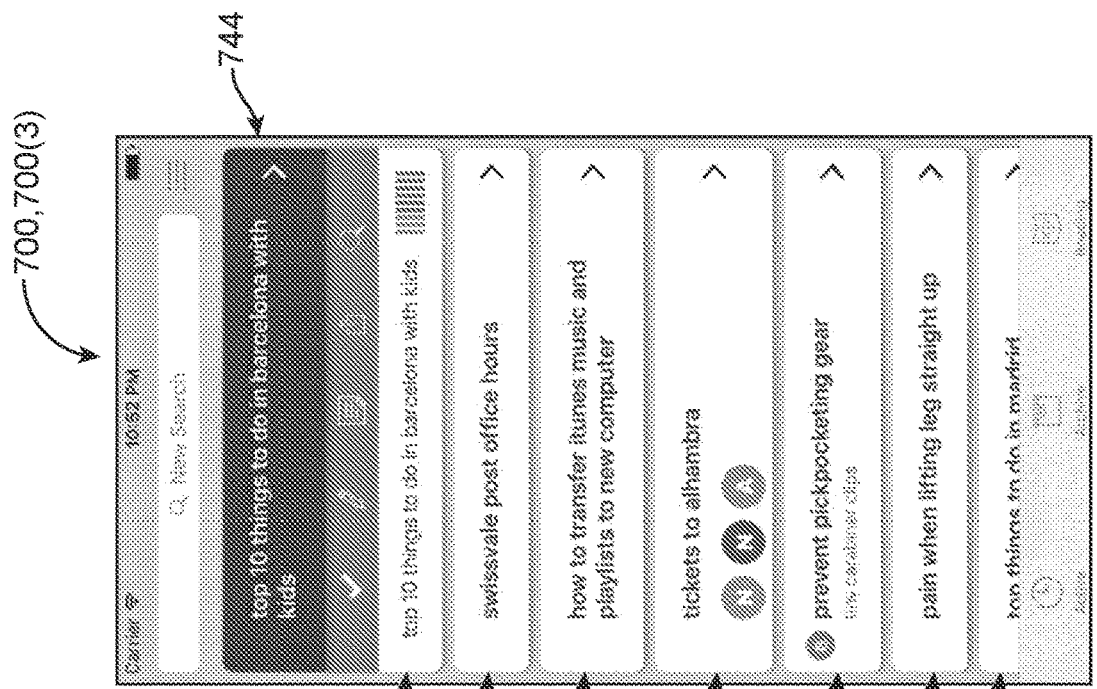
FIG. 7C is a screenshot of the task-card GUI of FIG. 7A, showing a plurality of task-card visual representations with one of the task-cards having been user-selected.
Figure 7F:
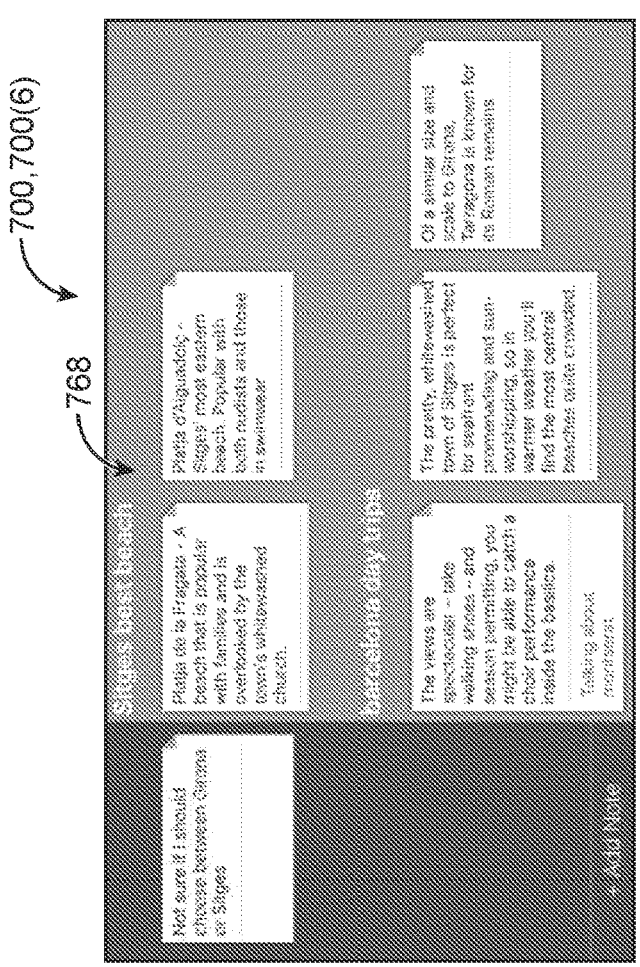
FIG. 7F is a screenshot of a notes GUI of the search-ecosystem UI of FIG. 7A.

FIG. 7C shows search-ecosystem UI 700 displaying a number of task-card visual representations, here at least part of each of seven task-card visual representations 740(1) to 740(7), with the user having initially selected task-card visual representation 740(1), for example, by a tapping gesture, so as to cause the search-ecosystem UI to expand the information displayed about the corresponding task card. Correspondingly, FIG. 7D shows an interactive-workspace screen 720(2) that search-ecosystem UI 700 displays when the user opens the interactive workspace, for example, by a tapping gesture performed on link 744. As seen in FIG. 7D, interactive-workspace screen 720(2) is similar in form and functionality to interactive-workspace screen 720(1) of FIG. 7B. As in panel 608 of FIG. 6, search-results item 748(2) of interactive-workspace screen 720(2) of FIG. 7D is shown after a user has performed a swipe-right gesture to reveal "To Read" and "Star" controls 752 and 756, respectively.

Figure 7E:
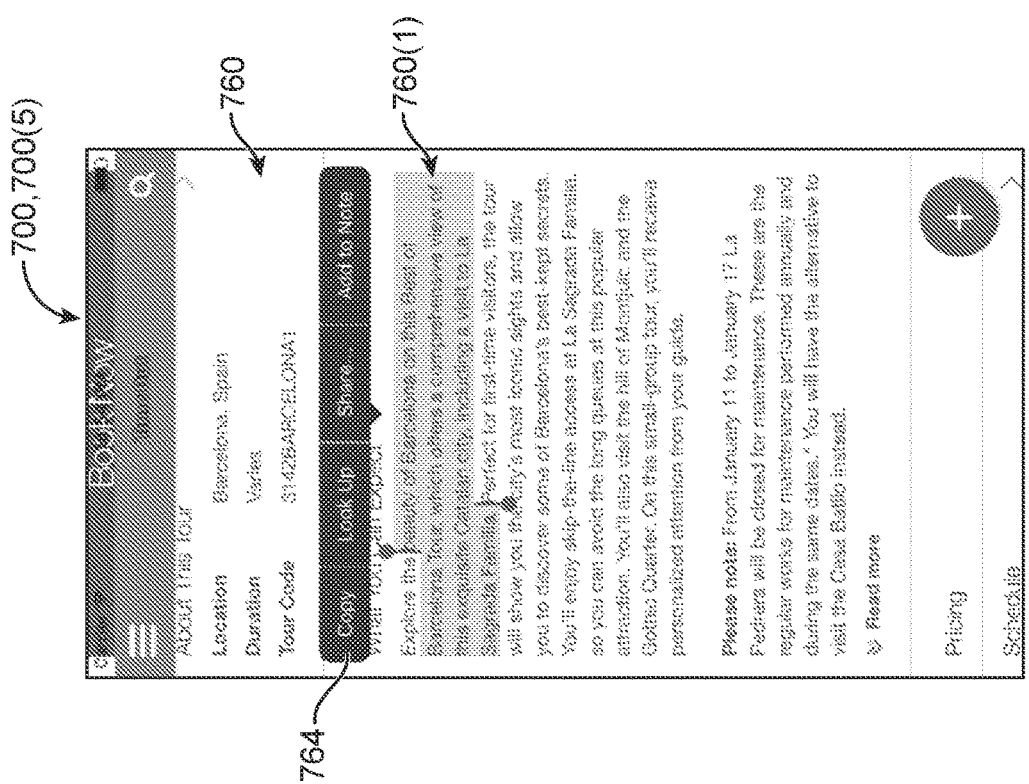
FIG. 7E is a screenshot of a search-results-item GUI of the search-ecosystem UI of FIG. 7A, illustrating various search-results-item functionalities.

FIG. 7E illustrates search-ecosystem UI 700 displaying a page 760 linked to via one of the search-results items on one of the interactive-workspace screens, such as one of interactive-workspace screens 720(1) (FIG. 7B) and 720(2) (FIG. 7D). In screenshot 704(5), the user has highlighted a portion 760(1) of text of page 760 and activated an options bar 764 that allows the user to, among other things, add a note, here via "Add to Note" control, to a notes collection, such as the notes collection 768 of FIG. 7F.

Figures 8A, 8B:
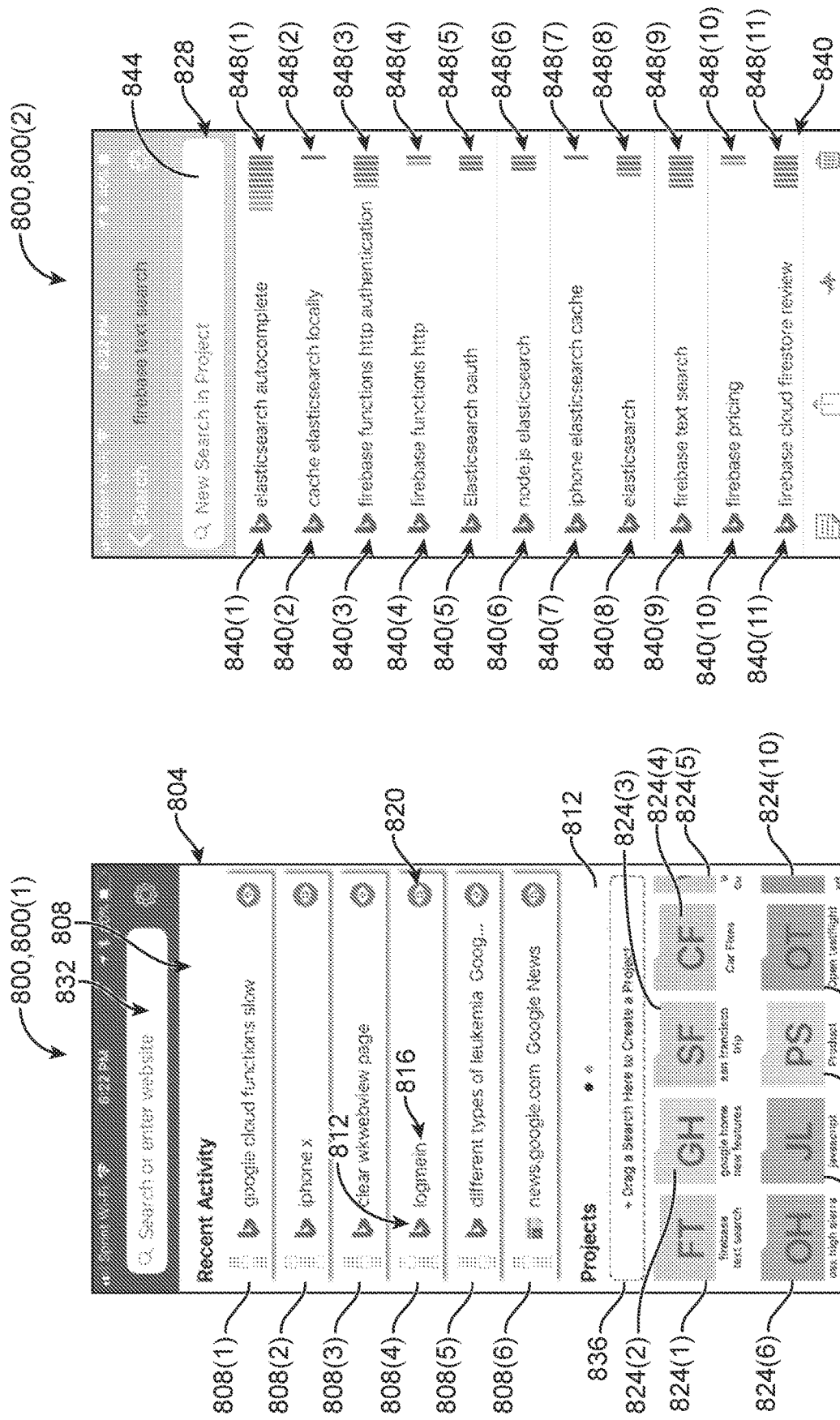
FIG. 8A is a screenshot of a homescreen of a task-card GUI of a search-ecosystem UI of the present disclosure, showing a plurality of recent-activity search tiles and a plurality of task-card folder icons, among other things.
FIG. 8B is a screenshot of a task-card screen of the task-card GUI of FIG. 8A, showing a plurality of search-results links for one of the task cards.

FIGS. 8A to 8D illustrate yet another example instantiation of a search-ecosystem UI 800 of the present disclosure. It is noted that FIGS. 8A to 8D are full or nearly full screenshots 800(1) to 800(4) of search-ecosystem UI 800 as displayed on a smartphone (not shown). Screenshot 800(1) of FIG. 8A illustrates a homescreen 804 of search-ecosystem UI 800. In this example, homescreen 804 includes a recent-activity region 808 and a projects region 812. Recent-activity region 808 contains a plurality of search tiles, here six search tiles 808(1) to 808(6) are displayed. Each search tile 808(1) to 808(6) in this example displays an icon 812 (only one labeled for convenience) corresponding to the search tool used, the search query 816 (only one labeled for convenience) used for that search tool, and an interactive-workspace selection control 820 (only one labeled for convenience) that allows the user to link to an interactive workspace screen (not shown) corresponding to the search. In this example, projects region 812 contains a plurality of task-card visual representations, here task-card folder icons 824(1) to 824(10), each of which the user can select to open a corresponding task-card screen, such as task-card screen 828 of FIG. 8B that corresponds to task-card folder icon 824(1) of FIG. 8A.

In this example, homescreen 804 includes a search-query-input field 832 that allows the user to conduct a search using a desired search tool (not shown) or navigate to a website. When a user conducts a search via search-query-input field 832, search-ecosystem UI adds a search tile to recent-activity region 808. If the user desires to create a new task card, they drag the corresponding search tile (e.g., one of search tiles 808(1) to 808(6)) to an add-task-card region 836, here labeled "+Drag a Search Here to Create a Project". When the user does this, search-ecosystem UI 800 creates and labels a new task-card folder icon and adds the icon and label to projects region 812, which may be a currently off-screen portion of the projects region depending, for example, on how many task-card folder icons are present, how much display area is available, what task-card folder icons the search-ecosystem UI is currently display, and how the search-ecosystem UI arranges the task-card folder icons (e.g., temporally, alphabetically, etc.)

When a user selects one of the task-card folder icons (e.g., one of task-card folder icons 824(1) to 824(10)), for example, using a tapping gesture, search-ecosystem UI 800 opens a corresponding task-card screen. In the example shown, when the user selects task-card folder icon 824(1), search-ecosystem UI 800 opens task-card screen 828 of FIG. 8B. Referring to FIG. 8B, task-card screen 828 includes search-results-link display region 840 that displays a list of search-results links, here search-results links 840(1) to 840(11), corresponding to the searches the user has performed for the corresponding task card. Initially, when the user has performed only the first search used to create a task card, search-results-link display region 840 displays only a search-results link corresponding to that initial search. In the example shown, the task card and task-card screen 828 is for the "firebase text search" search (see task folder icon 824(1)), and search-ecosystem UI 800 displays search-results link 840(9) as a result. Subsequent searches that the user performs via task-card screen 828, here via task-card dedicated search-query-input field 844 (labeled "New Search in Project") causes search-ecosystem UI 800 to add additional search-results links, such as search-results links 840(1) to 840(8), 840(10), and 840(11). In this example, each search-results link 840(1) to 840(11) includes an interaction visual indicator 848(1) to 848(11), which may be the same as or similar to interaction visual indicators 716(1) to 716(3) of FIG. 7A.

Figures 8C, 8D:
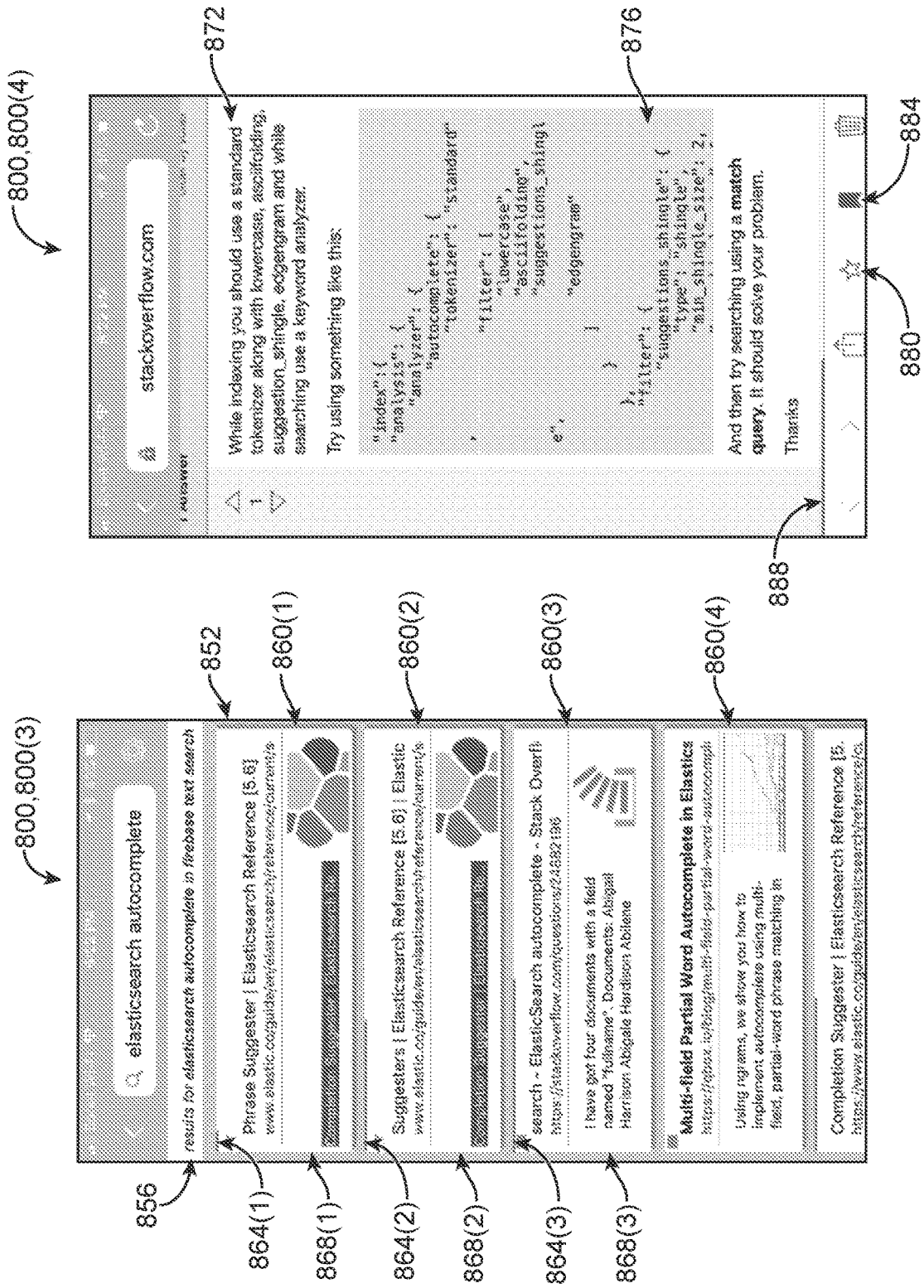
FIG. 8C is a screenshot of an interactive-workspace GUI of the search-ecosystem UI of FIG. 8A, illustrating various interactive-workspace functionalities.
FIG. 8D is a screenshot of a search-results-item GUI of the search-ecosystem UI of FIG. 8A, illustrating various search-results-item functionalities.

Screenshot 800(3) of FIG. 8C illustrates an interactive-workspace screen 852 that includes a workspace identifier 856 that shows which search results (i.e., interactive workspace) the user is currently in. Here, the user is viewing results from the "elasticsearch autocomplete" search results (see search-results link 840(1) of FIG. 8B) of the "firebase text search" task card (see task-card folder icon 824(1) of FIG. 8A). Interactive-workspace screen 852 of FIG. 8C shows four full search-results items 860(1) to 860(4), with the user having opened search-results items 860(1) to 860(3) (no bolded text; see search-results item 860(4) for comparison), having starred search-results items 860(1) and 860(2), and having tagged search results items 860(3) and 860(4) as to be read. Each of search-results item 860(1) to 860(3) also includes an interaction visual indicator, here a "progress bar" indicator 864(1) to 864(3) located at the top of the corresponding search-results item display box 868(1) to 868(3). Note that search-results item 860(4) does not have a progress bar because the user has not yet opened it and therefore has not interacted with it.

FIG. 8D illustrates search-ecosystem UI 800 displaying a browser window 872 that is displaying a webpage 876 linked to via search-results item 860(3) on interactive-workspace screen 852 of FIG. 8C. In this example, browser window 872 of FIG. 8D includes a star-item control 880 and a flag-for-reading control 884 that allows the user to, respectively, add a star to search-results item 860(3) and add a to-be-read indicator to search-results item 860(3). Browser window 872 also includes an interaction visualization indicator, here a progress bar 888, that indicates the level of interaction the user has had with webpage 876.

Figure 9:
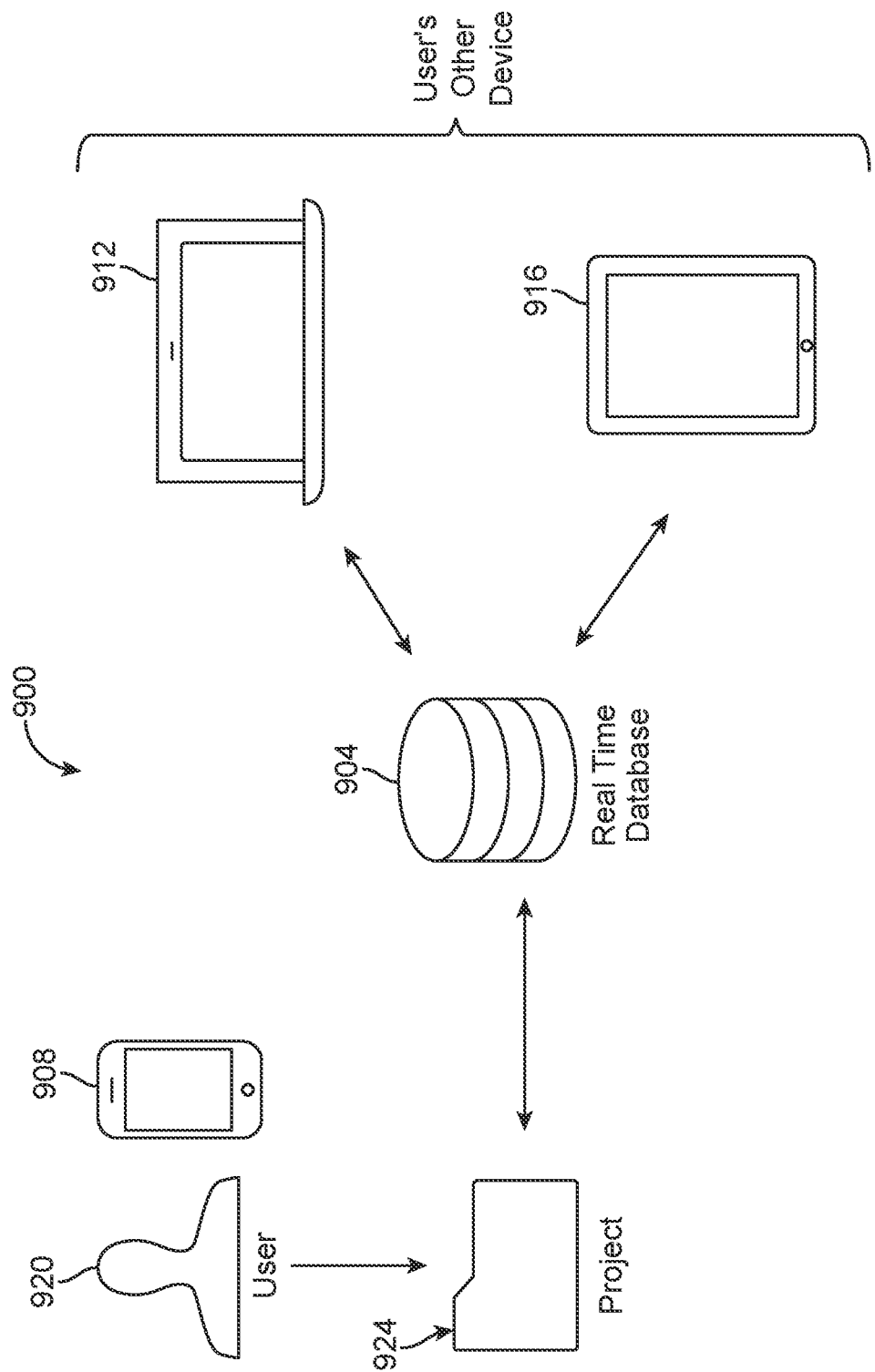
FIG. 9 is a diagram of a network-based implementation of a search-ecosystem-UI system of the present disclosure, illustrating realtime synching among multiple user devices.

FIG. 9 illustrates an example network-based implementation of a search-ecosystem UI system 900 of the present disclosure. In this example, search-ecosystem UI system 900 is deployed using a realtime database 904 that contains a search-ecosystem-UI datastore (not shown) that underlies the various functionalities of a search-ecosystem UI as implemented on one or more of devices, here a smartphone 908, a laptop computer 912, and a tablet computer 916, utilized by a particular user, here user 920 at differing points in time. As described above, a search-ecosystem UI 924 of the present disclosure allows users to conduct one or more searches, relate the search results of those searches to one or more task cards (projects), allow a user to interact with search-result items, track the user's interactions with search-result items, and/or display various indicators representing or memorializing the interactions. By using realtime database 904 that effectively centralizes all of the data associated with the searching that user 920 conducts using search-ecosystem UI 924, the data can be synched to all of user's devices 908, 912, 916 to allow the user to pick up on one device where they left off on another device.

Figure 10:
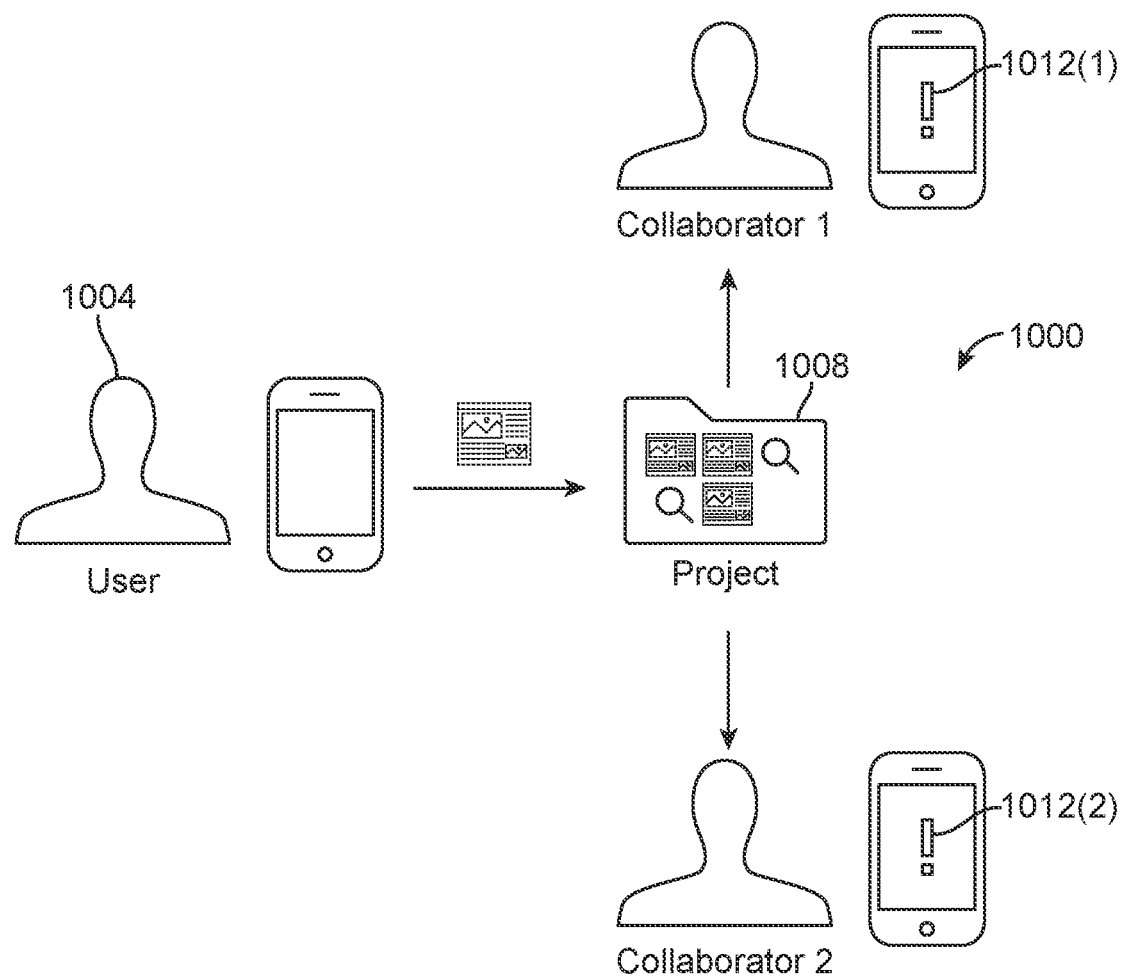
FIG. 10 is a diagram of a network-based implementation of a search-ecosystem-UI system of the present disclosure, illustrating group-sharing of task cards and related functionalities.

As described above, some permit the sharing of task cards among users of a search-ecosystem UI system. FIG. 10 illustrates an example of such sharing in the context of search-ecosystem UI system 1000. FIG. 10 illustrates a user 1004 that originates a task card 1008 sharing the task card with other users, here denoted as Collaborator 1 and Collaborator 2. When user shares task card 1008 and perhaps gives contributor rights to those collaborators so that they can contribute content to and/or interactions with search-results items of the task card. In some embodiments, when user 1004 adds collaborators, such as Collaborator 1 and Collaborator 2, search-ecosystem UI system 1000 may push notifications to the collaborators and the originating user updating them on some or all of the activities relating to the shared task card 1008. In the example shown, user 1004 has engaged in activity with task card 1008, and, correspondingly, search-ecosystem UI pushes notifications, represented by exclamation points 1012(1) and 1012(2), to Collaborators 1 and 2.

Figures 11A, 11B, 11C:
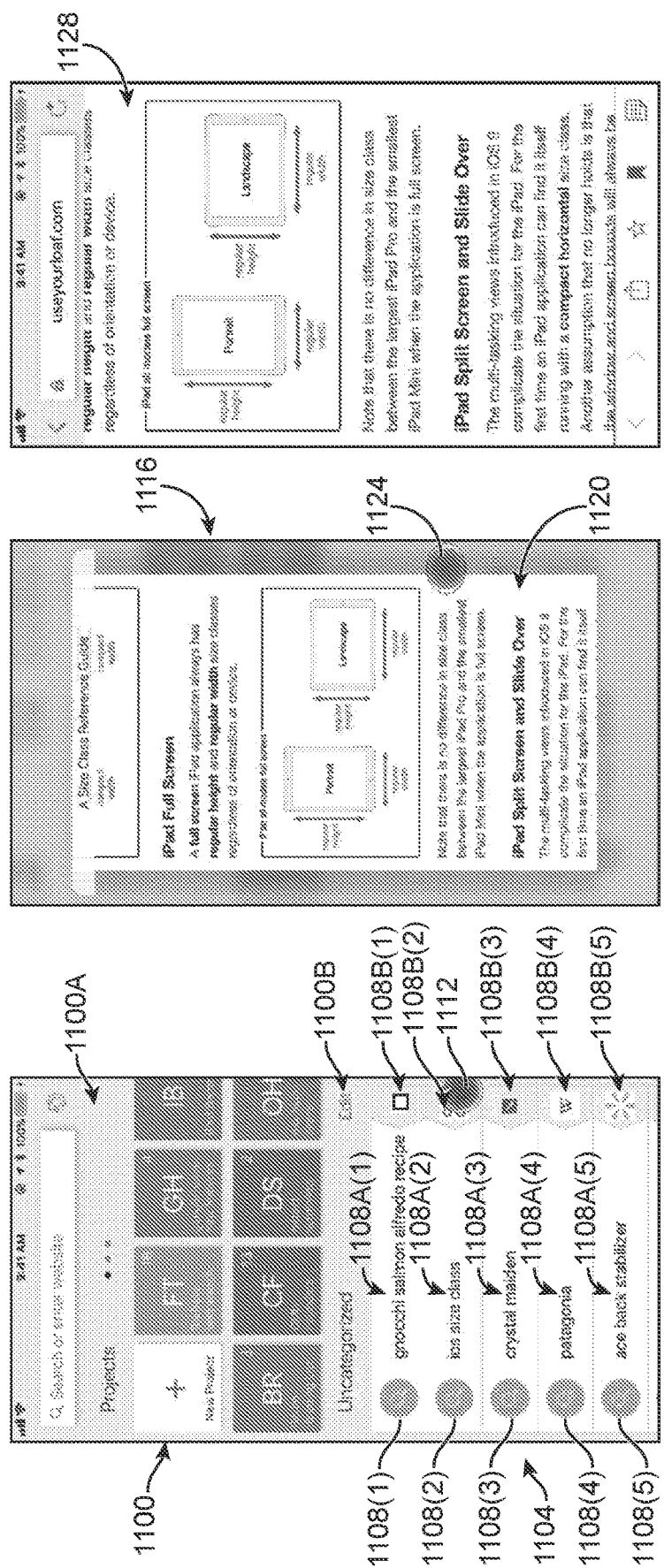
FIG. 11A is a screenshot of a homescreen GUI of a search-ecosystem UI of the present disclosure, illustrating a last-item-visited functionality of the search-ecosystem UI.
FIG. 11B is a screenshot of the search-ecosystem UI of FIG. 11A, showing the search-ecosystem UI displaying a last-item-viewed window displaying content of the last item visited in a selected search as the item is stored in datastore of the search-ecosystem UI.
FIG. 11C is a screenshot of the search-ecosystem UI of FIG. 11A, showing the search-ecosystem UI displaying a webpage corresponding to the last item visited displayed in the last-item-viewed window of FIG. 11B.

FIGS. 11A to 11C illustrate an example feature that a search-ecosystem UI of the present disclosure can be provided with if desired. This feature provides a user with a fast and simple way to return to the most-recently viewed search-result item in any search-results list desired. Turning first to FIG. 11A, this figure shows a homescreen GUI 1100 of a search-ecosystem UI 1104 of the present disclosure. While search-ecosystem UI 1104 of FIG. 11A may have any or all of the functionalities and features described above for search-ecosystem UIs of the present disclosure, for the sake of simplicity only the most-recent-item-viewed functionality is described here. In this example, homescreen GUI 1100 includes a project (or task-card) region 1100A that displays a list of projects already added to search-ecosystem UI 1104 and an uncategorized-search region 1100B that displays a list of searches that the user has not associated with any project. As seen in uncategorized-search region 1100A, five previously conducted searches are currently visible, and each is represented by a corresponding search tile 1108(1) to 1108(5). In this example, each search tile 1108(1) to 1108(5) includes a search name 1108A(1) to 1108A(5) and an icon 1108B(1) to 1108B(5) that indicates the source of the search results for the corresponding search.

In one example, search-ecosystem UI 1104 is running on a device (not shown) (e.g., smartphone or tablet computer, among others) that includes a display having touch-pressure sensitivity. In this example, when a user desires to see the last search item they interacted with in any of the searches in uncategorized-search region, they touch the corresponding search tile 1108(1) to 1108(5) (here, a user is touching search tile 1108(2) as indicated by element 1112), and apply a relatively large pressure for at least the minimum amount of time required for search-ecosystem UI 1104 to react. In response, the device and search-ecosystem UI 1104 change the display to a last-item-viewed window 1116 (FIG. 11B) that displays content 1120 from the most-recently viewed search item in the corresponding search. In some embodiments, content 1120 that search-ecosystem UI 1104 displays in last-item-viewed window 1116 is content that the search-ecosystem UI 1104 has stored in its search-ecosystem UI datastore (not shown), which may be available even if the device is not connected to the Internet or other source of the search-results items.

Referring to FIG. 11B, while the device is displaying last-item-viewed window 1116, the user may decide they want to visit the original source of content 1120 displayed in the last-item-viewed window. In the present example, to do this, the user provides a relatively high-pressure touch while viewing content 1120 via last-item-viewed window 1116, as illustrated by element 1124. In response to this special-case touch, the device and search-ecosystem UI 1104 cause the search-ecosystem UI to link to the source of content 1120, here a webpage 1128 (FIG. 11C) having the uniform resource locator (URL) "useyourloaf.com". Search-ecosystem UI 1104 uses URLs and/or other source locators it stores along with search-result content, such as content 1120, in its search-ecosystem-UI datastore to cause the search-ecosystem UI to link to the appropriate source.

While the foregoing example is described in terms of using a device having a touch-pressure-sensitive display, the same functionality can be effected using other inputs. For example, search-ecosystem UI 1104 may be configured to work with non-pressure-sensitive displays by recognizing a rapid double-tap to take the place of the relatively high-pressure touches described above in connection with FIGS. 11A to 11C. Of course, there are other manners of signaling a search-ecosystem UI of the present disclosure that it is to invoke the most-recent-item-viewed functionality described herein. It is also noted that while the foregoing examples are in the context of uncategorized searchers, the same functionality can be implemented within task cards and their corresponding searches.

Figure 12A:
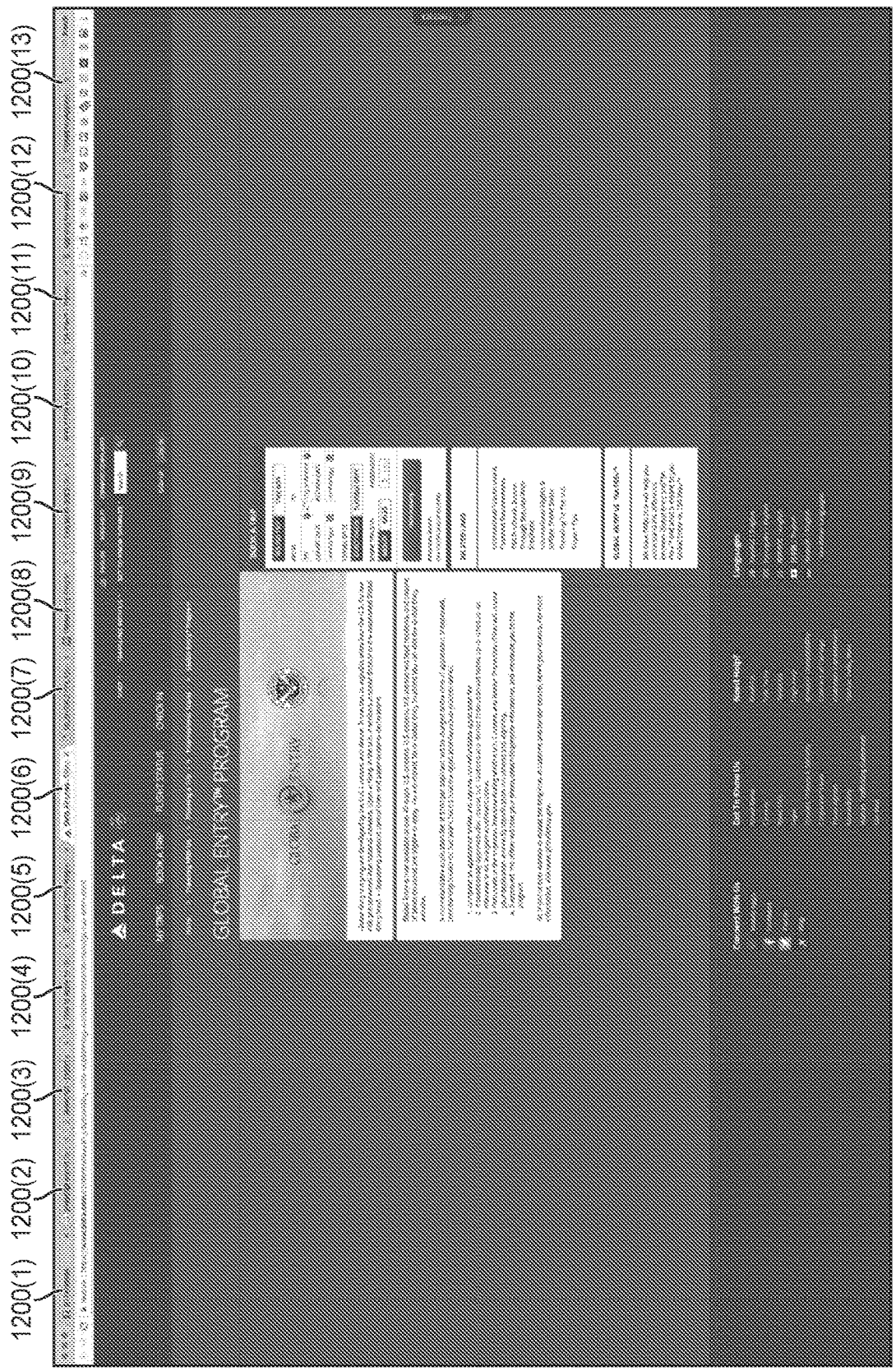
FIG. 12A is a screenshot of a conventional web browser having a set of open browser tabs and including a search-ecosystem-UI extension of the present disclosure.
Figure 12B:
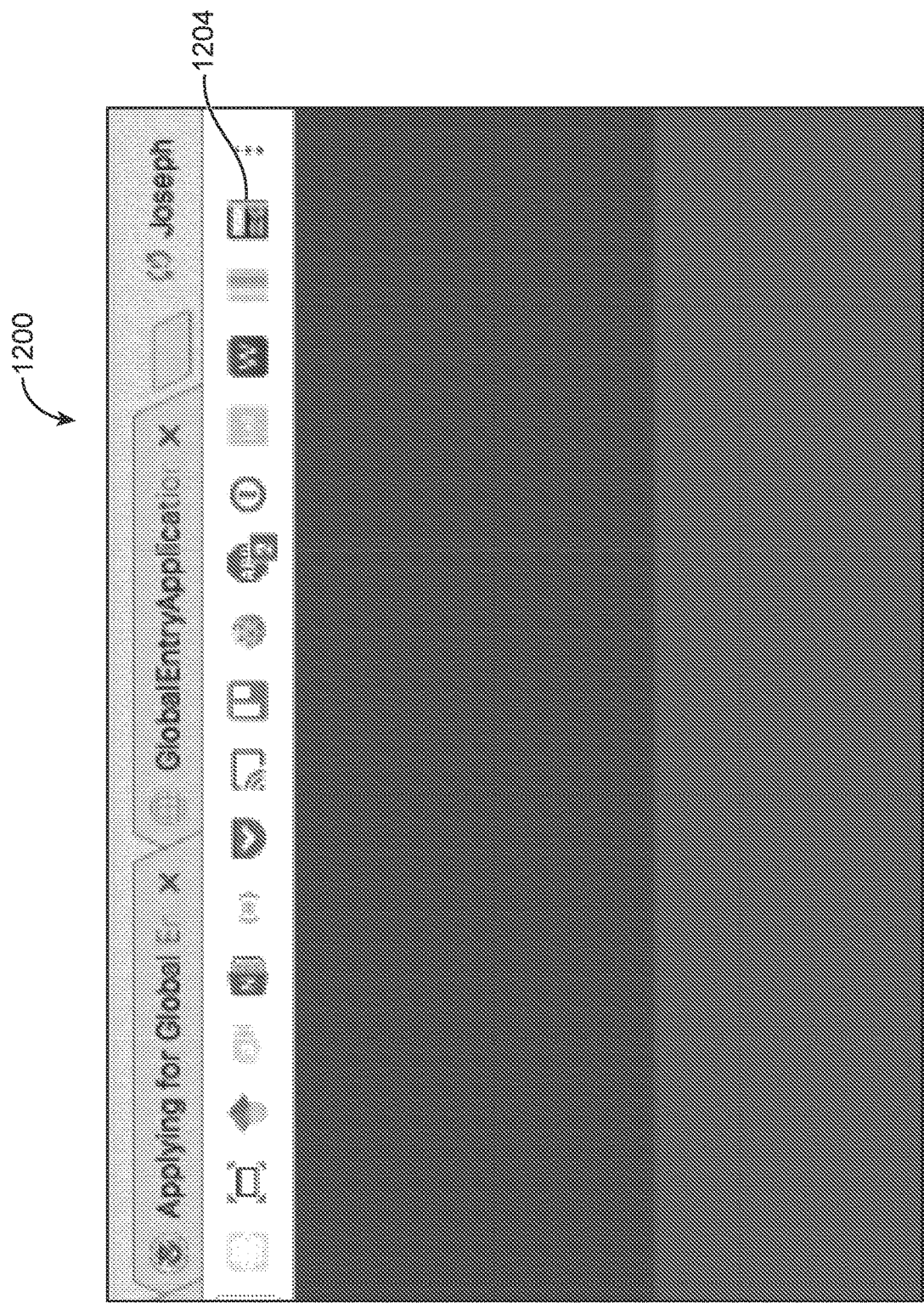
FIG. 12B is a screenshot showing a portion of the web browser of FIG. 12A highlighting the browser's toolbar and inclusion of a link that activates the search-ecosystem-UI extension.
Figure 12C:
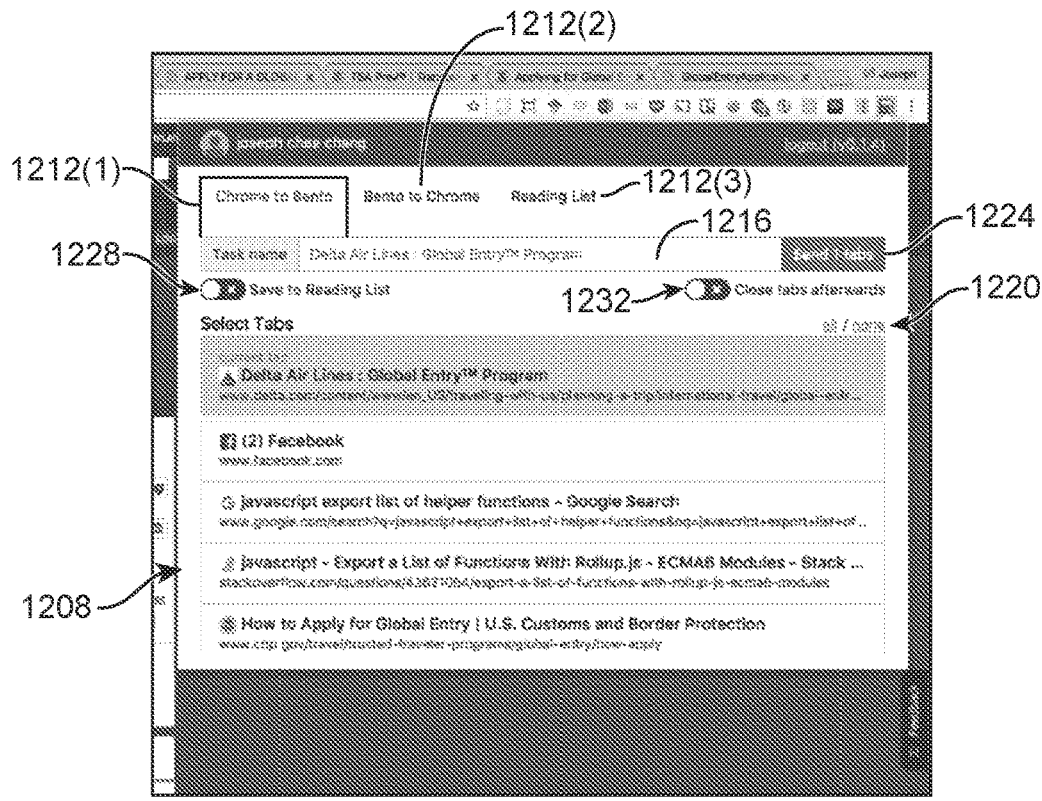
FIG. 12C is a screenshot showing a portion of the web browser of FIG. 12A displaying a search-ecosystem-UI window after the user has activated the search-ecosystem-UI extension.

As mentioned above, a search-ecosystem UI of the present disclosure can be embodied in a web browser in any of a variety of ways, including an extension. FIGS. 12A to 12H illustrate an example instantiation of a search-ecosystem-UI extension (not shown, but executable on the underlying computing device) for a conventional web browser 1200. It is noted that web browser 1200 illustrated in FIGS. 12A to 12H is a version of the CHROME™ browser available from Google, Inc., Mountain View, Calif. However, it can be any suitable web browser. As seen in FIG. 12A, web browser 1200 is shown as having 13 open tabs 1200(1) to 1200(13), a number of which are directed to user searches relating to the topic of the global entry program administered by the U.S. Government. As seen in FIG. 12B, web browser 1200 includes a search-ecosystem-UI icon 1204 that a user uses to activate functionality of the search-ecosystem-UI extension. When a user selects icon 1204, for example, using a point-and-click technique or touch gesture, web browser opens a search-ecosystem-UI window 1208 as seen in FIG. 12C.

Figure 12D:
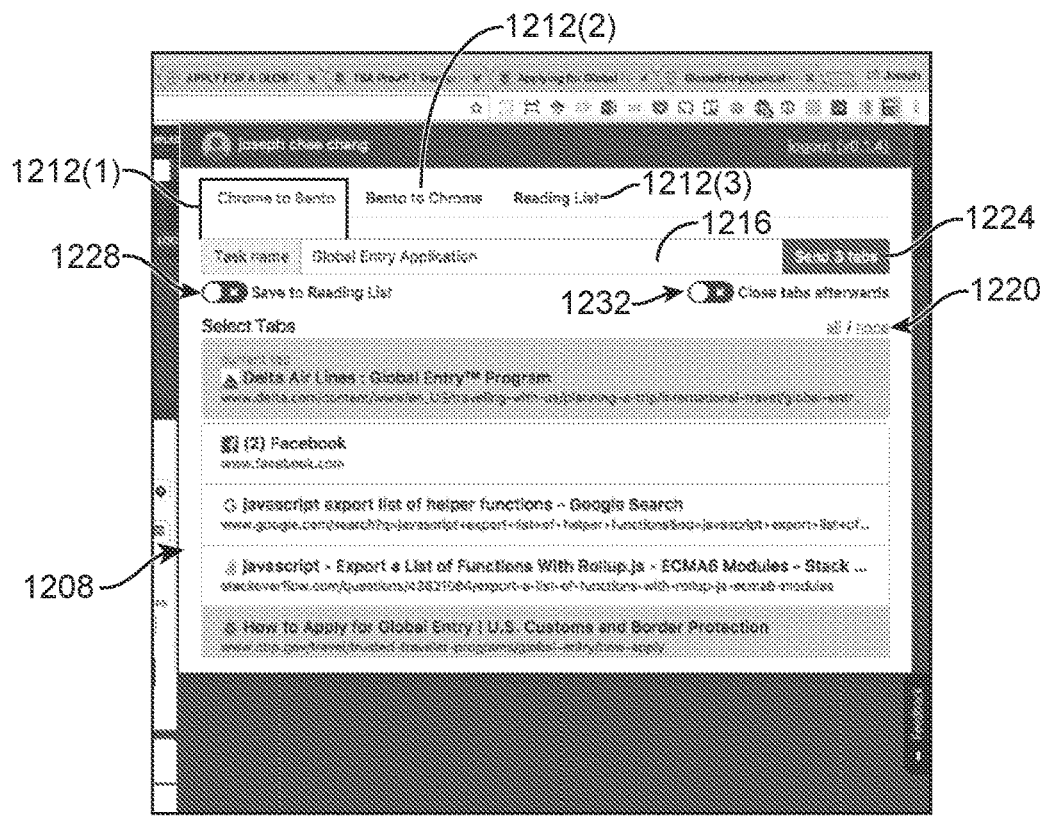
FIG. 12D is a screenshot showing a portion of the web browser of FIG. 12A after the user has interacted with the search-ecosystem-UI window of FIG. 12C to select 3 tabs for sending to the search-ecosystem-UI datastore and to change the name of the task card.

Referring to FIG. 12C, in this example search-ecosystem-UI window 1208 includes three tabs 1212(1), 1212(2), and 1212(3) that provide certain search-ecosystem-UI functionalities. It is noted that two of the tabs, i.e., tabs 1212(1) and 1212(2), include the term "Bento", which in this context is being used in a trademark sense to identify the search-ecosystem UI running within web browser 1200. For the sake of this example, however, "Bento" is to be used interchangeably with "search-ecosystem UI". Tab 1212(1) is labeled "Chrome to Bento" and provides functionality for creating task cards and exporting open browser tabs, such one or more of browser tabs 1200(1) to 1200(13) (FIG. 12A), to one or more of the task cards. In this example, tab 1212(1) includes a task-name field 1216 that allows the user to create and/or set the name for a new task card (not shown) and a browser-tab-list pane 1220 that lists all of the open browser tabs, here, browser tabs 1200(1) to 1200(13). When a user first opens search-ecosystem-UI window 1208, the default in this example is to populate task-name field 1216 with the currently active browser tab, which in this case is browser tab 1200(6) (see FIG. 12A). However, if the user desires, they can change the name of the task card. This is illustrated in FIG. 12D, wherein the user has changed the task-card name in task-name field 1216 to "Global Entry Application". When the search-ecosystem UI creates a new task card, here by selecting a "Send" control 1224 (FIGS. 12C and 12D), it creates a new task card with the name "Global Entry Application" by populating the relevant fields of the search-ecosystem UI's datastore (not illustrated) with the appropriate information. In addition, in some embodiments a search-ecosystem-UI extension of this disclosure can be configured to monitor or otherwise have access to the amount of time the user has spent within each browser tab and with each search-result item the user visited. Consequently, such a search-ecosystem-UI extension can provide any one or more of the access and interaction monitoring functionalities described above relative to other embodiments. In some embodiments, a search-ecosystem-UI extension of this disclosure may also monitor or otherwise have access to information indicating the user's reading progress within search results such that the search-ecosystem-UI extension can keep track of this information for providing useful functionalities, such as allowing the user to easily return to the most-recently accessed search result item in each set of search results.

As noted, when the user opens search-ecosystem-UI window 1208, browser-tab-list pane 1220 lists all of the open browser tabs 1200(1) to 1200(13) and reflects their corresponding searches. However, not all of open browser tabs 1200(1) to 1200(13) may be related to the task card the user wants to create or may not otherwise be searches the user wants to include in the task card. Consequently, browser-tab-list pane 1220 includes functionalities that allows a user to select which one(s) of the searches corresponding to the displayed browser tabs 1200(1) to 1200(13) to associate with the current task card. For example, the search-ecosystem UI may allow the user to select and/or deselect individual ones of browser tabs 1200(1) to 1200(13) to create a final list of browser tabs to send to the search-ecosystem-UI datastore, here, by selecting "Send" control 1224 when done with the selections. FIG. 12C shows "Send" control 1224 displaying "1 tab", because the user has selected only one of browser tabs 1200(1) to 1200(13) within browser-tab-list pane 1200, and FIG. 12D shows "Send" control 1224 displaying "3 tabs", because the user has selected three of browser tabs 1200(1) to 1200(13) within browser-tab-list pane 1200.

Tab 1212(1) of search-ecosystem-UI window 1208 includes a "Save to Reading List" control 1228 that allows a user to select whether or not to add the task card created to a reading list (not shown). Tab 1212(1) also includes a "Close tabs afterwards" control 1232 that allows a user to select whether or not to close the one(s) of browser tabs 1200(1) to 1200(13) after being sent to the search-ecosystem-UI datastore.

Figure 12E:
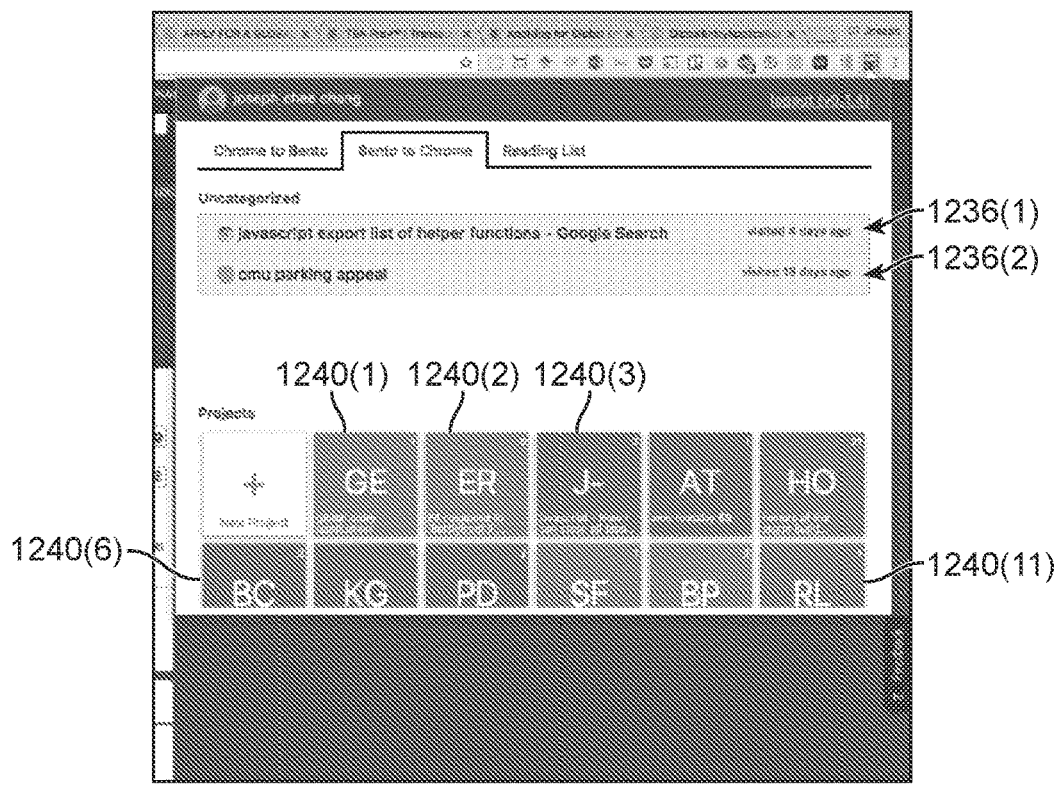
FIG. 12E is a screenshot showing a portion of the web browser of FIG. 12A after the user has selected the "Bento to Chrome" tab within the search-ecosystem-UI window of FIGS. 12C and 12D.

Referring to FIG. 12E, tab 1212(2) is labeled "Bento to Chrome" and provides functionality for opening browser tabs of browser 1200 based on searches already contained in the search-ecosystem-UI datastore. In this example, when the user selects tab 1212(2), the tab's window displays any previously saved uncategorized searches, here uncategorized searches 1236(1) and 1236(2) and any previously saved or created task-cards, here, task cards 1240(1) to 1240(11) (only several labeled for convenience). If the user wants browser 1200 to open any browser tabs for uncategorized searches 1236(1) and 1236(2), the user can select each one, for example, by pointing and clicking or double-clicking or tapping or double-tapping, among other possibilities. When a user makes each selection, browser 1200 (FIG. 12A) will open a corresponding browser tab (not shown) using the corresponding search-results source (e.g., URL) contained in the search-ecosystem-UI datastore.

Figure 12F:
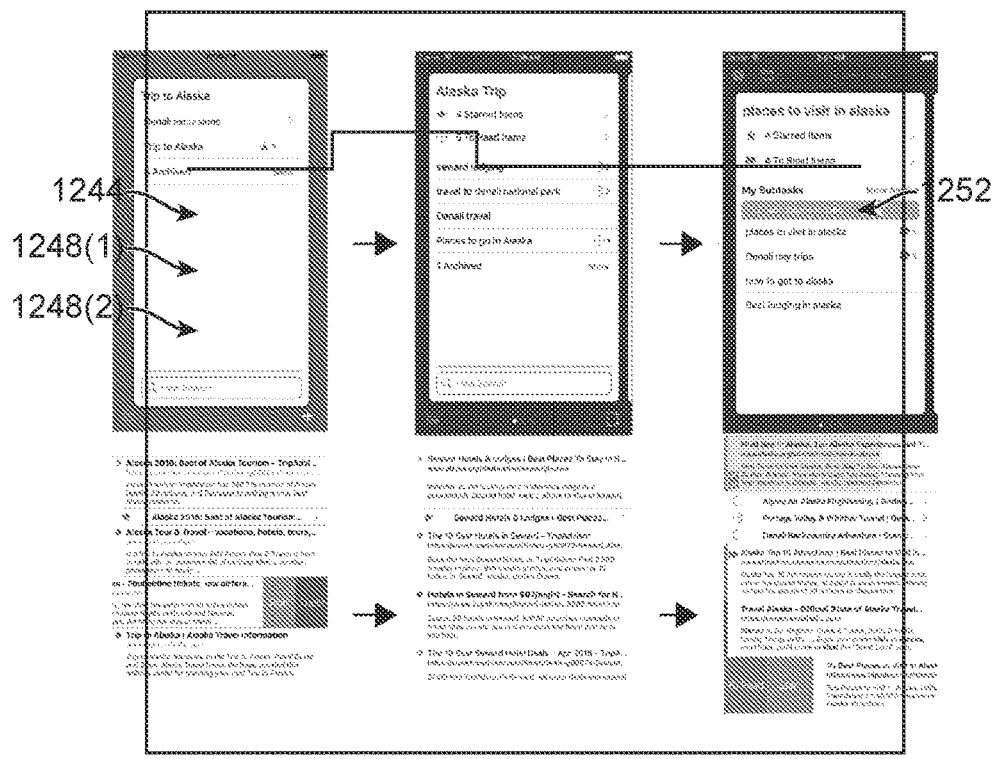
FIG. 12F is a screenshot showing a portion of the web browser of FIG. 12A after the user has selected one of the projects displayed in the screenshot of FIG. 12E.

The user may also open a task card, such as any one of task cards 1240(1) to 1240(11) using any suitable pointing and clicking, tapping, or other technique suitable for the hardware being used. When the user opens a task card, as seen in FIG. 12F a tab-window of tab 1212(2) displays a task-card tile 1244 and a search tile for each of the searches associated with the task card, here search tiles 1248(1) and 1248(2). As can be readily seen, in this example, task-card tile 1244 has the title of the search of search tile 1248(1). The user can open browser tabs within browser 1200 (FIG. 12A) using the same techniques as for uncategorized searches 1236(1) and 1236(2) or using an "open all" control 1252 contained in task-card tile 1244. Using "open all" control 1252 provides a convenient way for the user to open multiple browser tabs when a task card includes multiple searches. While not illustrated, when the user selects tab 1212(3), the tab's window displays a list of items that the user or one or more other users have flagged for the reading list.

Figure 12G:
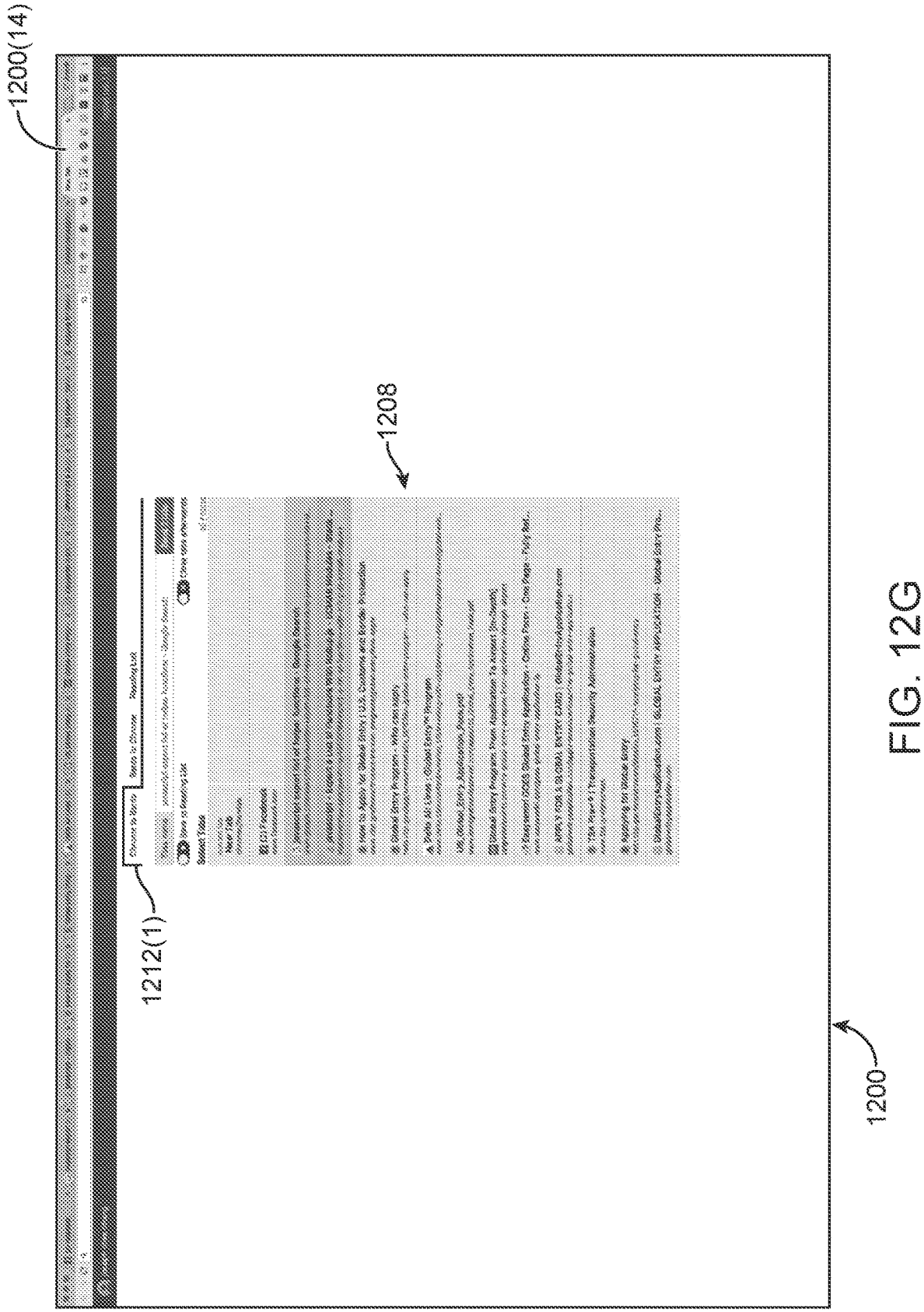
FIG. 12G is a screenshot of the web-browser of FIG. 12A after the user has opened a new browser tab, illustrating an example task-centric-GUI window that the search-ecosystem-UI extension displays.
Figure 12H:
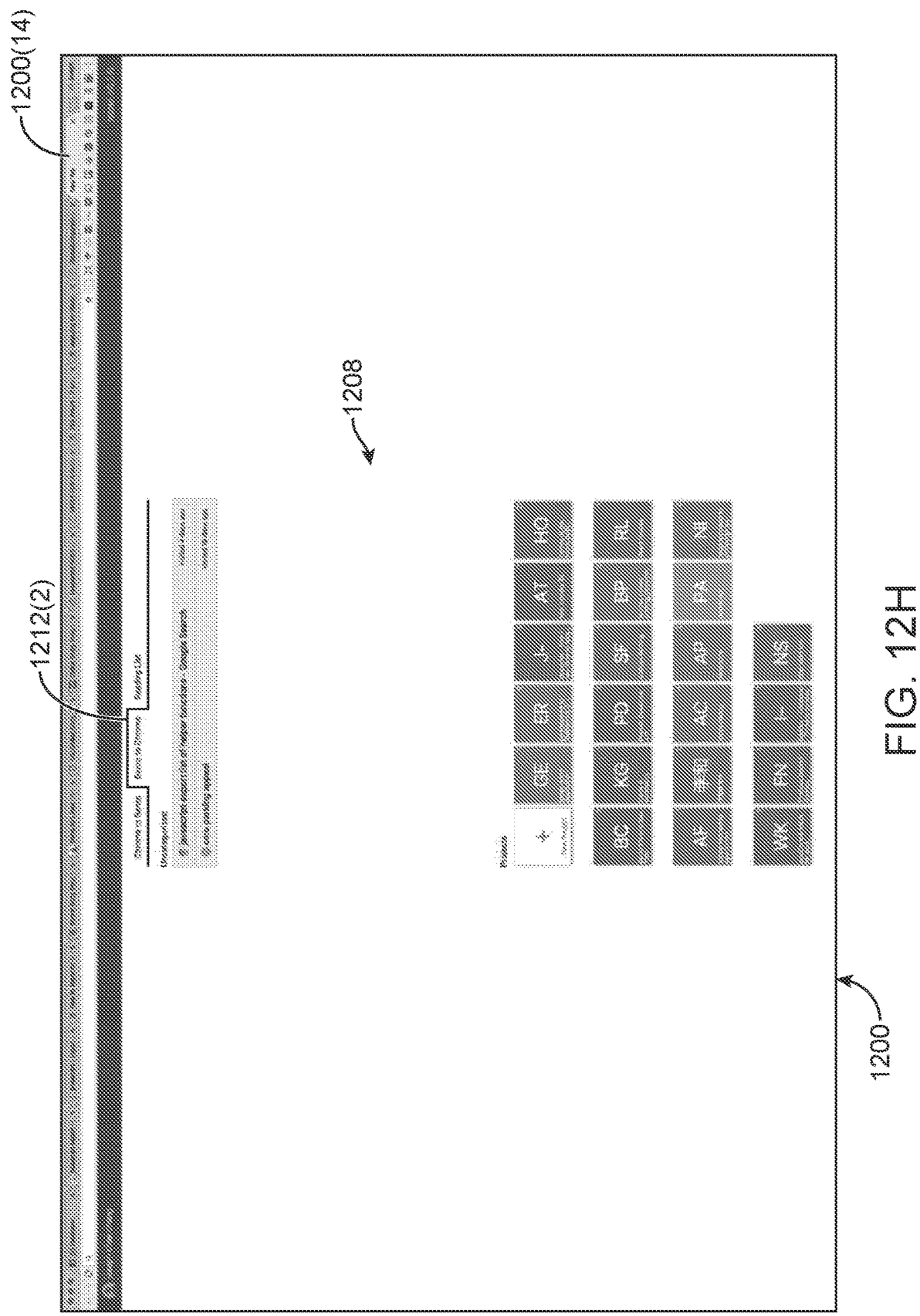
FIG. 12H is a screenshot of the web-browser of FIG. 12A after the user has opened a new browser tab and selected the "Bento to Chrome" tab within the task-centric-GUI window of FIG. 12G.

As illustrated by FIGS. 12G and 12H, the user may configure the search-ecosystem-UI extension so that when a user opens a new browser tab within web browser 1200 (FIG. 12A), here browser tab 1200(14), it causes the browser to display search-ecosystem-UI window 1208 within the window of the newly opened tab. The user may then use search-ecosystem-UI window 1208 in any suitable manner, such as the manner described above relative to FIGS. 12C to 12F. FIG. 12G illustrates search-ecosystem-UI window 1208 when the user has selected tab 1212(1), and FIG. 12H illustrates the search-ecosystem-UI window when the user has selected tab 1212(2).

While the foregoing example search-ecosystem-UI functionalities of FIGS. 12A to 12H is presented in the context of an extension for a web browser, it can be embodied an any of a variety of other ways. For example, these functionalities can be coded directly into a web browser or other sort of search tool that includes tabs or tab-like Again, the foregoing instantiations are merely exemplary. Those skilled in the art will readily understand that a virtually limitless number of other instantiations are possible.

Example Data Types

This section illustrates an example datastore specification for implementing various functionalities of a search-ecosystem UI of the present disclosure. Those skilled in the art will readily appreciate that this example is merely illustrative and by no means limiting. Those skilled in the art also will readily understand how to implement this example datastore specification, portions of this specification, and/or other datastore specifications for other instantiations of a search-ecosystem UI of the present disclosure.

Task Structure

Task. A task, or task card or project, represents the highest level information task a user might have in the datastore. These are composed of one or more subtasks and can be shared with other individuals. Tasks are where all security is based; an individual is given access to a task if it is a part of its list of users. /task/{task_id}
- color Can be used to let users assign colors to their tasks for easier identification.
- lastOpened The last time this task was opened. May be used in non-multi-user scenarios.
- name The overall name of a task.
- lastMessage The last time a message was sent on this task. May be used in non-collaborative scenarios.
- shareId A unique ID used for sharing this task with other users. This ID is incorporated into a URL, and then anyone who has this URL can add themselves to a task. (Can be similar to a Google Docs link, for example.)

The userData associated with each task is denormalized in the datastore. It is located separately under: useroata/task/$task_id/$user_id. This is a list of all users given permission to access this task and considered a "collaborator" on this task.
- color The individual user color. If a collision occurs, a Firebase function, for example, may be used to try to resolve it.
- dateAdded When this user was added to this task (JS timestamp)
- lastupdate When the user last updated this task/did something in this task (JS timestamp)
- lastLocation The last place a user was as a part of this task. Should resolve to a routable URL. This can then be used to track down a user and to also display their location in the task.
- name The user's name as it appears to everyone on the task.

Subtask. These represent individual information queries (a/k/a searches) and belong to a larger task. They are created whenever a user performs a new query, and a task always starts with one subtask (the initial query performed to generate the task). /subtasks/{task_id}/{subtask_id}
- name The name of the subtask. Can be taken from the search performed. Perhaps may allow editing.
- nextResultUrl The URL to query to get the next set of search results.
- relatedResults If the search returned any related searches, this is a simple array of those search queries.
- alternateSpelling If there was a correction to the spelling of the search query, this field will be set with the original, alternative spelling that could be used.
- spellingDisplay This is the query we actually ended up performing based on spelling fixes.

Results. These are the search results returned by the search tool. They are what appear after a subtask is selected, and typically contain a title, snippet of information, URL, and image. /results/{task_id}/{subtask_id}/{result_id}

Pages. This contains information about each visited page. The information is generally divided up by user and contained in userData. /pages/{task_id}/{hashed_page_url. The pages are stored at the task level, instead of the subtask or result level. Page level information (notes, highlights, how long we've been on a page for, starred pages, etc.) is desired to persist between subtasks. Additionally, pages are stored by creating a hash of their URL so we can lazily reference URLs and not have to wait on a database query. When loading/changes pages, we can allow the load to go forward without waiting on the return from the database.

favicon A URL linking to the favicon for the page.

title The title of the page. Can be blank if the page does not have a title.

highlightsHash and highlights May be utilized for showing highlights on a page and recording where a user previously highlighted on a page.

PagePaths. A PagePath tracks each user's path from a search result. It contains a navigation stack, as well as a navigation tree for each user. /pagePaths/{task_id}/{subtask_id}/{result_id}/{user_id}

Supplementary Data

Activity Feed. The activity feed is a chronological list of all activity that has happened within a task. This includes creating new subtasks, starring pages, sending messages, etc. /activityFeed/{task_id}/{activity_item_id}

Notes. Notes are either user generated or clipped from pages. They are associated with each individual subtask. However, they could be moved from subtask to subtask. /notes/{task_id}/{subtask_id}/{note_id}

User Structure

Users. This is where all individual user data is stored, apart from inside a task. Their main task list resides here under /tasks as well as their personal information under /profile/users/{user_id}.

Usernames. A simple list mapping usernames to the user ID they belong to. This is used to ensure uniqueness of the username (a/k/a the key isn't already taken) and to allow for quick lookup based on username.

UserData. This contains all of the denormalized, per-user data associated with specific tasks, subtasks, and pages.

Profile.

bingID When the Bing web search engine is used, this is a unique ID returned from Bing. This allows Bing to track the user's queries, and provide personalized information based on their previous queries. Set once the first Bing query is performed.

email The user's email address name The user's username (shared with the username list)

preferredColor The user's preferred color for collaboration. We try to let the user have this color when working with others, otherwise we give them a randomized color.

firstLaunch If this user has gone through the first-launch experience. May be for allowing new features/have new first-launches.

consentVersion The last version of the consent the user agreed to.

databaseVersion The last-migrated version of the database this user was using.

Task userData. This is a list of all the tasks a user has, along with information about when this task was last accessed, or was last updated.

simple—This value will be set if this is a "simple" search. Uses a timestamp for ordering based on last access.

complex—This value will be set if the task is "complex". Uses a timestamp for ordering based on last access.

trash—This value will be set if this task has been trashed. A timestamp of when the item was trashed.

total—This is used for generally tracking the last access to a task. Will be updated regardless of the above conditions.

Subtask userData. Each user's individual subtask information. The userData associated with each task is denormalized in the database. It is located separately under: userData/subtask/$task_id/$subtask_id/$user_id.

lastPageVisited The last page the user was on in this subtask.

lastvisit This is a timestamp for the last time a user opened this subtask. If it is negative, that means the user archived this subtask.

dateAdded When the user was "added" to this subtask. Useful for possibly determining difference between self vs other's subtasks.

lastUpdate This is a timestamp for the last time a user performed an action in this subtask. If it is negative, that means the user archived this subtask.

isAssigned A BOOL indicating if this user was "assigned" this subtask. Could be used for division of labor.

shouldRecieveUpdates A BOOL if this user should get notifications about this subtask.

These next fields are duplicate information from the list of pages. However, they allow quick access to interesting information about the pages in the subtask without sifting through them all.

opened A list of all the pages opened by the user from this subtask. The key is the hashed_page_url and the value is the search_result_id starred A list of all the pages marked with a star by the user. The key is the hashed_page_url and the value is the search_result_id toRead A list of all the pages marked as "toRead" by the user. The key is the hashed_page_url and the value is the search_result_id Page userData. This is per-user page data, including information about the page's triage priority, as well as user behavior on the page. The userData associated with each page is denormalized in the database. It is located separately under: userData/page/$task_id/$page_id/$user_id.

scrollPosition—The user's current scroll position on the page pageTime—The total time the user has spent looking at this page scrollDepth—The furthest position a user scrolled to on a page starred—A bool for if this page has been starred or not opened—A bool for if this page has been opened or not toRead—A bool for if this page was marked "toRead" or not Example Computing System It is to be noted that any one or more of the aspects and embodiments described herein may be conveniently implemented in and/or using one or more machines (e.g., one or more computers, one or more communications network devices, one or more electrical distribution network devices, any combination and/or network thereof, among other things) programmed according to the teachings of the present specification, as will be apparent to those of ordinary skill in the computer arts. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, a laptop computer, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 13:
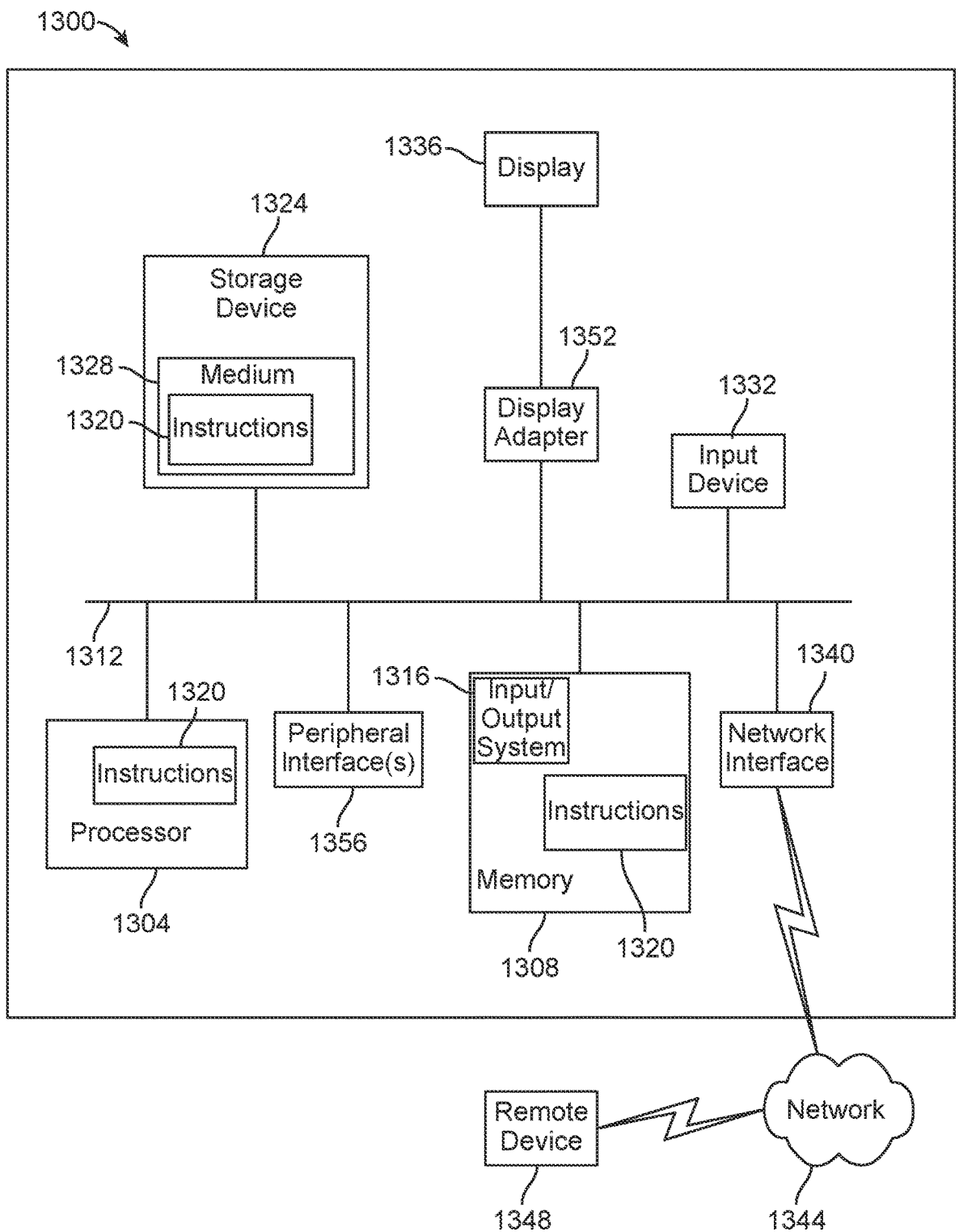
FIG. 13 is a high-level schematic diagram of an example computing system that can be used to implement any software of the present disclosure.

FIG. 13 shows a diagrammatic representation of one embodiment of a computing device in the example form of a computer system 1300 within which a set of instructions for performing any one or more of the aspects and/or methodologies of the present disclosure may be executed. It is also contemplated that multiple computing devices may be utilized to implement a specially configured set of instructions for causing one or more of the devices to contain and/or perform any one or more of the aspects and/or methodologies of the present disclosure. Computer system 1300 includes a processor 1304 and a memory 1308 that communicate with each other, and with other components, via a bus 1312. Bus 1312 may include any of several types of bus structures including, but not limited to, a memory bus, a memory controller, a peripheral bus, a local bus, and any combinations thereof, using any of a variety of bus architectures.

Memory 1308 may include various components (e.g., machine-readable media) including, but not limited to, a random access memory component, a read only component, and any combinations thereof. In one example, a basic input/output system 1316 (BIOS), including basic routines that help to transfer information between elements within computer system 1300, such as during start-up, may be stored in memory 1308. Memory 1308 may also include (e.g., stored on one or more machine-readable media) instructions (e.g., software) 1320 embodying any one or more of the aspects and/or methodologies of the present disclosure. In another example, memory 1308 may further include any number of types of software, including, but not limited to, an operating system, one or more application programs, other program modules, program data, and any combinations thereof.

Computer system 1300 may also include a storage device 1324. Examples of a storage device (e.g., storage device 1324) include, but are not limited to, a hard disk drive, a magnetic disk drive, an optical disc drive in combination with an optical medium, a solid-state memory device, and any combinations thereof. Storage device 1324 may be connected to bus 1312 by an appropriate interface (not shown). Example interfaces include, but are not limited to, SCSI, advanced technology attachment A(TA), serial ATA, universal serial bus U(SB), IEEE 1394 (FIREWIRE), and any combinations thereof. In one example, storage device 1324 (or one or more components thereof) may be removably interfaced with computer system 1300 (e.g., via an external port connector (not shown)). Particularly, storage device 1324 and an associated machine-readable medium 1328 may provide nonvolatile and/or volatile storage of machine-readable instructions, data structures, program modules, and/or other data for computer system 1300. In one example, software 1320 may reside, completely or partially, within machine-readable medium 1328. In another example, software 1320 may reside, completely or partially, within processor 1304.

Computer system 1300 may also include an input device 1332. In one example, a user of computer system 1300 may enter commands and/or other information into computer system 1300 via input device 1332. Examples of an input device 1332 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1332 may be interfaced to bus 1312 via any of a variety of interfaces (not shown) including, but not limited to, a serial interface, a parallel interface, a game port, a USB interface, a FIREWIRE interface, a direct interface to bus 1312, and any combinations thereof. Input device 1332 may include a touch screen interface that may be a part of or separate from display 1336, discussed further below. Input device 1332 may be utilized as a user selection device for selecting one or more graphical representations in a graphical interface as described above.

A user may also input commands and/or other information to computer system 1300 via storage device 1324 (e.g., a removable disk drive, a flash drive, etc.) and/or network interface device 1340. A network interface device, such as network interface device 1340, may be utilized for connecting computer system 1300 to one or more of a variety of networks, such as network 1344, and one or more remote devices 1348 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1344, may employ a wired and/or a wireless mode of communication. In general, any network topology may be used. Information (e.g., data, software 1320, etc.) may be communicated to and/or from computer system 1300 via network interface device 1340.

Computer system 1300 may further include a video display adapter 1352 for communicating a displayable image to a display device, such as display device 1336.

Examples of a display device include, but are not limited to, a liquid crystal display (LCD), a cathode ray tube (CRT), a plasma display, a light emitting diode (LED) display, and any combinations thereof. Display adapter 1352 and display device 1336 may be utilized in combination with processor 1304 to provide graphical representations of aspects of the present disclosure. In addition to a display device, computer system 1300 may include one or more other peripheral output devices including, but not limited to, an audio speaker, a printer, and any combinations thereof. Such peripheral output devices may be connected to bus 1312 via a peripheral interface 1356. Examples of a peripheral interface include, but are not limited to, a serial port, a USB connection, a FIREWIRE connection, a parallel connection, and any combinations thereof.

The foregoing has been a detailed description of illustrative embodiments of the invention. It is noted that in the present specification and claims appended hereto, conjunctive language such as is used in the phrases "at least one of X, Y and Z" and "one or more of X, Y, and Z," unless specifically stated or indicated otherwise, shall be taken to mean that each item in the conjunctive list can be present in any number exclusive of every other item in the list or in any number in combination with any or all other item(s) in the conjunctive list, each of which may also be present in any number. Applying this general rule, the conjunctive phrases in the foregoing examples in which the conjunctive list consists of X, Y, and Z shall each encompass: one or more of X; one or more of Y; one or more of Z; one or more of X and one or more of Y; one or more of Y and one or more of Z; one or more of X and one or more of Z; and one or more of X, one or more of Y and one or more of Z.

Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve aspects of the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A method of providing a search-ecosystem user interface to assist a user in searching information stored within a computer system and in managing results of the searching, the method being performed by software providing the search-ecosystem user interface and comprising:
    displaying a task-card-identification control;
    receiving a first task-card identifier from the user via the task-card-identification control;
    creating a first task card and associating the first task-card identifier with the first task card;
    displaying a task-card search-query field associated with the first task card;
    receiving a first search query input by the user into the task-card search-query field;
    in response to receiving a first initiate-search input from the user for initiating a search that uses the first search query:
        sending, via the computer system, the first search query to at least one search tool on the computer system;
        receiving a first set of search results from the at least one search tool in response to the first search query;
        displaying ones of the first set of search results in a first interactive workspace; and
        adding the first search query to the first task card as a first search hyperlink; and
    displaying a first visual representation of the first task card, wherein the first visual representation includes the first search hyperlink, and wherein the first search hyperlink is provided to allow the user to redisplay the ones of the first set of search results to the user in the first interactive workspace by selecting the first search hyperlink.

2. The method according to claim 1, further comprising:
    receiving a second search query input by the user into the task-card search-query field;
    in response to receiving a second initiate-search input from the user for initiating a search that uses the second search query:
        sending, via the computer system, the second search query to at least one search tool on the computer system;
        receiving a second set of search results from the at least one search tool in response to the second search query;
        displaying ones of the second set of search results in a second interactive workspace; and
        adding the second search query to the first task card as a second search hyperlink;
    displaying the first visual representation of the first task card, wherein the first visual representation includes the first search hyperlink and the second search hyperlink;
    receiving via the first visual representation a user-selection of the second search hyperlink; and
    in response to receiving the user-selection of the second search hyperlink, displaying the ones of the second set of search results in the second interactive workspace.

3. The method according to claim 1, wherein:
    the displaying of a task-card-identification control includes displaying a task-card-naming field configured to receive a task-card name input by the user;
    the receiving of the first task-card identifier includes receiving the task-card name from the user; and
    the associating of the first task-card identifier includes associating the task-card name with the first task card.

4. The method according to claim 3, further comprising visually labeling the first visual representation with the task-card name.

5. The method according to claim 1, wherein:
    the displaying of a task-card-identification control includes displaying a search-query field configured to receive a second search query input by the user;
    the receiving of the first task-card identifier includes receiving the second search query from the user; and
    the associating of the first task-card identifier includes associating the second search query with the first task card.

6. The method according to claim 5, further comprising visually labeling the first visual representation with the second search query.

7. The method according to claim 1, further comprising visually labeling the first visual representation with the first task-card identifier.

8. The method according to claim 1, further comprising:
receiving a second task-card identifier from the user via the task-card-identification control; and
creating a second task card and associating the second task-card identifier with the second task card.

9. The method according to claim 8, further comprising providing a task-card-selection user interface that displays the first and second task-card identifiers and allows the user to open one or the other of the first and second task cards based on the display of the first and second task-card identifiers.

10. The method according to claim 1, further comprising converting the first set of search results into a workspace list of items, wherein the first search hyperlink links to the workspace list.

11. The method according to claim 10, further comprising:
receiving a selection by the user of the first search hyperlink; and
in response to the selection of the first search hyperlink, displaying to the user the workspace list in the interactive workspace, wherein the interactive workspace is designed and configured to 1) allow the user to manipulate and interact with the items, 2) track interactions with the items; and 3) visualize the interactions with the items.

12. The method according to claim 11, wherein the interactive workspace is designed and configured to allow the user to delete one or more of the items from the workspace list, the method further comprising:
receiving from the user an indication to delete one or more of the items from the workspace list; and
in response to receiving the indication, deleting the one or more of the items from the workspace list.

13. The method according to claim 11, wherein the interactive workspace is designed and configured to allow the user to visually tag one or more of the items on the workspace list, the method further comprising:
receiving from the user an indication to visually tag one or more of the items from the workspace list; and
in response to receiving the indication, visually tag each of the one or more of the items on the workspace list within the interactive workspace.

14. The method according to claim 11, further comprising:
tracking a quantitative user interaction with one of the items on the workspace list;
displaying, within the interactive workspace and in association with the one of the items, a visual quantitative indicator based on the quantitative user interaction tracked.

15. The method according to claim 14, wherein the one of the items is a linked page, and the tracking of a quantitative user interaction includes tracking time the user spent on the linked page.

16. The method according to claim 14, wherein the one of the items is a linked page, and the tracking of a quantitative user interaction includes tracking scrolling by the user on the linked page.

17. The method according to claim 14, wherein the tracking of a quantitative user interaction includes tracking annotating the user performed on the one of the items.

18. The method according to claim 14, wherein the displaying of a visual quantitative indicator includes displaying a shading bar containing an extent of shading, wherein the extent of shading increases with increasing quantity of the quantitative user interaction.

19. The method according to claim 18, wherein the interactive workspace displays the shading bar as a background to an item identifier for the one of the items.

20. The method according to claim 14, wherein the displaying of a visual quantitative indicator includes displaying differing colors as a function of differing quantity of the quantitative user interaction.

21. The method according to claim 14, wherein:
the one of the items is a linked page containing a link to a corresponding other page;
the tracking of a quantitative user interaction includes tracking selection by the user of the link on the linked page; and
the displaying of a visual quantitative indicator includes displaying the link to the other page in association with the one of the first items.

22. A machine-readable storage medium containing computer-executable instructions for performing the method of claim 1.

* * * * *